US012669709B2

(12) United States Patent
    Ha

(10) Patent No.: US 12,669,709 B2
(45) Date of Patent: Jun. 30, 2026

(54) COMPACT OPTICAL DEVICE FOR AUGMENTED REALITY HAVING STRAIGHTLY-ARRANGED OPTICAL STRUCTURE, AND METHOD FOR MANUFACTURING OPTICAL MEANS

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 458 days.

(21) Appl. No.: 18/247,825

(22) PCT Filed: Jul. 8, 2021

(86) PCT No.: PCT/KR2021/008698
    § 371 (c)(1),
    (2) Date: Apr. 4, 2023

(87) PCT Pub. No.: WO2022/080627
    PCT Pub. Date: Apr. 21, 2022

(65) Prior Publication Data
    US 2023/0367128 A1    Nov. 16, 2023

(30) Foreign Application Priority Data
    Oct. 15, 2020    (KR) ........................ 10-2020-0133225

(51) Int. Cl.
    *G02B 27/01*    (2006.01)
(52) U.S. Cl.
    CPC ..... *G02B 27/0172* (2013.01); *G02B 27/0176* (2013.01); *G02B 2027/0123* (2013.01); *G02B 2027/015* (2013.01)

(58) Field of Classification Search
    CPC ........... G02B 27/0172; G02B 27/0176; G02B 2027/0123; G02B 2027/015;
    (Continued)

(56) References Cited

U.S. PATENT DOCUMENTS

| 2019/0187541 | A1* | 6/2019 | Yoshida | ............... | G03B 21/142 |
| 2019/0265477 | A1 | 8/2019 | Perreault et al. | | |
| 2021/0390783 | A1* | 12/2021 | Shin | ................... | G02B 27/4205 |

FOREIGN PATENT DOCUMENTS

| JP | 2008022364 A | 1/2008 |
| JP | 2014126753 A | 7/2014 |

(Continued)

*Primary Examiner* — Henry Duong
(74) *Attorney, Agent, or Firm* — Rabin & Berdo, P.C.

(57) ABSTRACT

The present invention provides a compact optical device for augmented reality, the compact optical device including: an optical means configured to transmit at least part of real object image light therethrough toward the pupil of a user's eye; a first reflective means embedded and disposed inside the optical means, and configured to transfer augmented reality image light, which is image light corresponding to an image for augmented reality output from an image output unit, to a second reflective means; and the second reflective means including a plurality of reflective units embedded and disposed in the optical means to transfer the augmented reality image light, transferred from the first reflective means, to the pupil of the user's eye by reflecting the augmented reality image light toward the pupil; wherein the optical means has first and second surfaces, and a method for manufacturing an optical means used in the same.

26 Claims, 36 Drawing Sheets

(58) Field of Classification Search
CPC .......... G02B 27/0081; G02B 2027/012; G02B
2027/0125; G02B 2027/0127; G02B
17/006; G02B 2027/0178; G02B 27/095;
G02B 27/30; G02B 27/0977; G02B
2027/0194; G02B 2027/0198; G02B 5/08;
B60R 1/084; B60R 1/088; B60R 1/089
USPC ........................................................ 359/602
See application file for complete search history.

(56) References Cited

FOREIGN PATENT DOCUMENTS

| | | | |
|----|----|----|----|
| JP | 6525041 | B2 | 6/2019 |
| JP | 2019-109435 | A | 7/2019 |
| KR | 10-1660519 | B1 | 9/2016 |
| KR | 10-2020-0045709 | A | 5/2020 |
| KR | 10-2020-0107027 | A | 9/2020 |
| WO | 2020/023266 | A1 | 1/2020 |
| WO | 2020/123528 | A1 | 6/2020 |
| WO | 2021085960 | A1 | 5/2021 |

* cited by examiner

30...31,32,33,34,35,36,37
30A...35,36,37
30B...31,32,33,34

Augmented reality
image light

Augmented reality
image light ( a )

( b )

COMPACT OPTICAL DEVICE FOR AUGMENTED REALITY HAVING STRAIGHTLY-ARRANGED OPTICAL STRUCTURE, AND METHOD FOR MANUFACTURING OPTICAL MEANS

TECHNICAL FIELD

The present invention relates to an optical device for augmented reality and a method for manufacturing an optical means, and more particularly to a compact optical device for augmented reality in which an optical structure for transferring the augmented reality image light, output from an image output unit, to the pupil is formed in a straightly-arranged structure, thereby improving optical efficiency and simplifying the manufacturing process, and a method for manufacturing an optical means used in the same.

BACKGROUND ART

Augmented reality (AR) refers to technology that superimposes a virtual image, provided by a computer or the like, on a real image in the real world and then provides a resulting image, as is well known.

In order to implement augmented reality, there is required an optical system that allows a virtual image, generated by a device such as a computer, to be superimposed on an image in the real world and then allows a resulting image to be provided. As such an optical system, there is known a technology using an optical means such as a prism for reflecting or refracting a virtual image by using a head-mounted display (MMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes a focal length when gazing at the real world. To overcome this problem, there have been proposed technologies such as a prism capable of adjusting a focal length for a virtual image and a variable focal lens which can be controlled electrically in response to a change in the focal length. However, these technologies also have a problem in that a user needs to perform a separate operation in order to adjust a focal length or in that hardware such as a separate processor and software for controlling a focal length are required.

In order to overcome the above-described problems of the conventional technologies, the present applicant has developed a device capable of implementing augmented reality by projecting a virtual image onto the retina through the pupil using a reflective unit having a size smaller than that of a human pupil, as described in patent document 1.

FIG. 1 is a diagram showing an optical device 100 for augmented reality as disclosed in patent document 1.

The optical device 100 for augmented reality shown in FIG. 1 includes an optical means 10, a reflective unit 30, an image output unit 40, and a frame unit 60.

The optical means 10 is a means for transmitting at least part of real object image light, which is image light output from a real object, therethrough, and may be, for example, a lens of eyeglasses. The reflective unit 30 is embedded and disposed inside the optical means 10. Furthermore, the optical means 10 also serves to transmit the augmented reality image light, reflected by the reflective unit 30, therethrough in order to transfer the augmented reality image light to the pupil.

The frame unit 60 is a means for fixing and supporting both the image output unit 40 and the optical means 10, and may be, for example, an eyeglass frame.

The image output unit 40 is a means for outputting augmented reality image light, which is image light corresponding to an image for augmented reality. For example, the image output unit 40 may include a small-sized display device configured to display an image for augmented reality on a screen and radiate augmented reality image light, and a collimator configured to collimate the image light, radiated from the display device, into parallel light.

The reflective unit 30 reflects the image light for augmented reality, output from the image output unit 40, toward a user's pupil, thereby providing an image for augmented reality.

The reflective unit 30 of FIG. 1 is formed to have a size smaller than that of the pupil size of people, i.e., 8 mm or less. By forming the reflective unit 30 to be smaller than the pupil size as described above, the depth of field for light entering the pupil through the reflective unit 30 may be made almost infinite, i.e., considerably deep.

Here, "depth of field" refers to a range within which an image for augmented reality is recognized as being in focus. The fact that the depth of field increases implies that a focal length for an image for augmented reality also increases.

Accordingly, even when a user changes the focal length for the real world while gazing at the real world, the user always recognizes an image for augmented reality as being in focus regardless of such a change. This may be viewed as a kind of pinhole effect.

Thus, even when the user changes the focal length while gazing at a real object present in the real world, the user can always view a clear virtual image for an image for augmented reality.

However, this technology has limitations in that the size, thickness, and volume of the device increase because an additional optical means such as a collimator for collimated light is used in the image output unit 40.

In order to solve this problem, a method of embedding and disposing a reflective unit such as a concave mirror inside the optical means 10 to perform the function of the collimator instead of using a collimator in the image output unit 40 may be taken into consideration FIG. 2 shows the comparison between a side view of the optical device 100 for augmented reality of FIG. 1 in which a collimator is provided in the image output unit 40 and a side view of an optical device 100-1 for augmented reality in which an auxiliary reflective unit 20 functioning as a collimator is disposed.

It can be seen that in the optical device 100 for augmented reality of FIG. 1 shown on the left side of FIG. 2, the image output unit 40 is composed of a display device 41 and a collimator 42. In contrast, in the optical device 100-1 for augmented reality on the right side of FIG. 2, the image output unit 40 is composed of only the display device 41 without the collimator 42.

In the optical device 100-1 for augmented reality on the right side of FIG. 2, an auxiliary reflective unit 20 in the form of a concave mirror that can function as a collimator is disposed inside the optical means 10 instead of using the collimator 42 in the image output unit 40. The augmented reality image light output from the image output unit 40 is reflected by the auxiliary reflective unit 20 and then transferred to the reflective unit 30, and the reflective unit 30 transfers the transferred augmented reality image light to the pupil.

As described above, the optical device 100-1 for augmented reality shown on the right side of FIG. 2 does not use a component such as a collimator in the image output unit 40 while performing the same function as the optical device 100 for augmented reality of FIG. 1, and thus has the advantage of significantly reducing form factors such as size, volume, thickness, and weight compared to the optical device 100 for augmented reality using an external collimator as shown on the left side of FIG. 2.

However, the optical device 100-1 for augmented reality shown on the right side of FIG. 2 has a problem in that unintended real object image light generating a ghost image may also be transferred to the pupil.

FIG. 3 is a diagram illustrating a phenomenon in which a ghost image is generated in the optical device 100-1 for augmented reality.

Referring to FIG. 3, real object image light, which is image light output from a real object, is directly transferred to the pupil through the optical means 10, and there is stray light that is reflected by the auxiliary reflective unit 20 and transferred to the pupil. Due to this stray light, the real object image light transferred to the pupil forms an image at a position different from the position of the real object image light transferred directly to the pupil through the optical means 10, so that a ghost image is generated.

Therefore, there is a demand for a compact optical device for augmented reality that may overcome a ghost image problem that may occur in the optical device 100-1 for augmented reality using an embedded collimator, which is the auxiliary reflective unit 20 shown in FIG. 2, in order to reduce the form factors, may widen a field of view (FOV) as described above, may reduce the size, thickness, weight and volume of the device, and may increase optical efficiency for augmented reality image light.

PATENT DOCUMENT 1

Korean Patent No. 10-1660519 (published on Sep. 29, 2016)

DISCLOSURE

Technical Problem

An object of the present invention is to provide a compact optical device for augmented reality in which an optical structure for transferring the augmented reality image light, output from an image output unit, to the pupil is formed in a straightly-arranged structure, thereby improving optical efficiency and simplifying the manufacturing process, and also provide a method for manufacturing an optical means used in the same.

Another object of the present invention is to provide an optical device for augmented reality that may significantly reduce the size, thickness, weight and volume thereof, may provide a wide field of view, and may minimize the leakage of real-world image light, which may generate a ghost image, toward a user's pupil, thereby maximizing a see-through property and also providing a clear virtual image.

Technical Solution

In order to accomplish the above objects, the present invention provides a compact optical device for augmented reality having a straightly-arranged optical structure, the compact optical device including: an optical means configured to transmit at least part of real object image light therethrough toward the pupil of a user's eye; a first reflective means embedded and disposed inside the optical means, and configured to transfer augmented reality image light, which is image light corresponding to an image for augmented reality output from an image output unit, to a second reflective means; and the second reflective means including a plurality of reflective units embedded and disposed in the optical means to transfer the augmented reality image light, transferred from the first reflective means, to the pupil of the user's eye by reflecting the augmented reality image light toward the pupil; wherein the optical means has a first surface on which real object image light is incident, and a second surface through which the augmented reality image light transferred through the second reflective means and the real object image light are output toward the pupil of the user's eye; wherein the second reflective means includes a plurality of reflective units having a size of 4 mm or less that are embedded and disposed inside the optical means; wherein, when the optical means is placed in front of the user's pupil and a forward direction from the pupil is set as an x axis, the image output unit is disposed outside or inside the optical means to be located on a straight line orthogonal to the x axis; and wherein, when any one of the line segments passing between the first and second surfaces of the optical means while being parallel to a vertical line extending from the image output unit to the x axis along the x axis is set as a y axis and a line segment orthogonal to the x axis and the y axis is set as a z axis: at least two of the plurality of reflective units form a first reflective unit group disposed inside the optical means so that centers thereof are located on a first straight line when the optical means is viewed from the outside toward a plane perpendicular to the z axis; at least two of remaining reflective units excluding the reflective units forming the first reflective unit group among the plurality of reflective units form a second reflective unit group disposed inside the optical means so that centers thereof are located on a second straight line that is not parallel to the first straight line when the optical means is viewed from the outside toward a plane perpendicular to the z axis; the reflective units forming the first reflective unit group are disposed inside the optical means to be located closer to the second surface of the optical means as a distance from the image output part increases; and the first reflective unit group is arranged to be positioned closer to the first reflective means than the second reflective unit group.

In this case, the reflective units constituting the second reflective unit group may have the same distance to the second surface of the optical means regardless of the distance from the first reflective means.

Furthermore, the reflective units constituting the second reflective unit group may be disposed farther from the second surface of the optical means as the distance from the first reflective means increases.

Furthermore, the first straight line and the second straight line may be included in any one plane perpendicular to the z axis.

Furthermore, the augmented reality image light output from the image output unit may be directly transferred to the first reflective means through the inside of the optical means, or may be reflected by total internal reflection on an inner surface of the optical means at least once and then transferred to the first reflective means.

Furthermore, the first reflective means may directly transfer the augmented reality image light to the second reflective means, or may transfer the augmented reality image light to the second reflective means after the augmented reality image light has been reflected by total internal reflection on an inner surface of the optical means at least once.

Furthermore, a reflective surface of the first reflective means that reflects the augmented reality image light may be disposed to face the first surface of the optical means on which the real object image light is incident.

Furthermore, a reflective surface of the first reflective means may be formed as a curved surface formed to be concave toward the first surface of the optical means.

Furthermore, the first reflective means may be formed to extend closer to the second reflective means in the directions from the central portion thereof toward both left and right ends thereof when the optical means is viewed from the pupil toward a forward direction.

Furthermore, the length of the first reflective means in the widthwise direction may be 4 mm or less.

Furthermore, the second reflective means may include a plurality of second reflective means, and the plurality of second reflective means may be arranged in parallel at intervals along the direction of the z-axis.

Furthermore, each of the second reflective means may be arranged such that each of the reflective units constituting each of the second reflective means is positioned together with any one of reflective units constituting an adjacent second reflective means along an imaginary straight line parallel to the z axis.

Furthermore, each of the second reflective means may be arranged such that each of reflective units constituting each of the second reflective means is not positioned together with all reflective units constituting an adjacent second reflective mean along an imaginary straight line parallel to the z axis.

Furthermore, the plurality of reflective units may be formed in bar shapes extending along imaginary straight lines parallel to the z axis.

Furthermore, there may be present at least one second reflective means that is disposed such that distances between the individual reflective means and the second surface of the optical means are not all the same.

Furthermore, the first reflective means may be formed to extend closer to the second reflective means in the directions from the central portion thereof toward both left and right ends thereof when the optical means is viewed from a plane perpendicular to the x axis.

Furthermore, a third surface through which the augmented reality image light output from the image output unit is incident on the optical means may be formed as a curved surface to have refractive power.

Furthermore, an auxiliary optical means may be disposed between the image output unit and the third surface.

Furthermore, at least some of the plurality of reflective units may each be formed of a half mirror or a refractive element.

Furthermore, at least some of the plurality of reflective units may each be coated with a material absorbing light without reflecting light on the surface thereof opposite to a surface thereof that reflects the augmented reality image light.

Furthermore, the surfaces of at least some of the plurality of reflective units may each be formed as a curved surface.

Furthermore, at least some of the plurality of reflective units may each be formed of a diffractive optical element (DOE) or a holographic optical element (HOE).

According to another aspect of the present invention, there is provided a method for manufacturing the above-described optical means, the method including: a first step of forming reflective units on a surface of a lower base substrate along a first direction; a second step of forming reflective units on a surface of each of a plurality of first substrates along a direction parallel to the first direction, and forming reflective units on a surface of each of a plurality of second substrates along a direction parallel to the first direction; a third step of sequentially bonding and stacking the plurality of first substrates on the surface of the lower base substrate; a fourth step of, after the third step, forming a second reflective means by sequentially bonding and stacking the plurality of second substrates on an uppermost one of the first substrates; a fifth step of forming an optical means base material by bonding and stacking an upper base substrate including a first reflective means on an uppermost one of the second substrates; and a sixth step of forming the optical means by processing the optical means base material; wherein the second step includes forming reflective units on a surface of each of the first and second substrates so that a line connecting the centers of reflective units formed on surfaces of the respective first substrates forms a straight line and a line connecting the centers of reflective units formed on surfaces of the respective second substrates forms a straight line when the first and second substrates are viewed from the outside toward a plane perpendicular to the first direction; wherein the straight line connecting the centers of the reflective units formed on the first substrates and the straight line connecting the centers of the reflective units formed on the second substrates are not parallel to each other; and wherein the sixth step includes forming the optical means by cutting the optical means base material in directions parallel to the first direction along two parallel straight lines that allow the reflective units to be all included therebetween when the optical means base material is viewed toward a plane perpendicular to the first direction.

According to still another aspect of the present invention, there is provided a method for manufacturing the above-described optical means, the method including: a first step of forming reflective units on a surface of a lower base substrate along a first direction; a second step of sequentially bonding and stacking a plurality of first substrates on the surface of the lower base substrate, and forming reflective units on a surface of each of the plurality of first substrates along a direction parallel to the first direction; a third step of, after the second step, sequentially bonding and stacking a plurality of second substrates on an uppermost one of the first substrates, and forming reflective units on a surface of each of the plurality of second substrates along a direction parallel to the first direction, thereby constructing a second reflective means; a fourth step of forming an optical means base material by bonding and stacking an upper base substrate, including a first reflective means, on an uppermost one of the second substrates; and a fifth step of forming an optical means by processing the optical means base material; wherein the second step includes forming reflective units on a surface of each of the first substrates so that a line connecting the centers of reflective units formed on surfaces of the respective first substrates forms a straight line when the first substrates are viewed from the outside toward a plane perpendicular to the first direction; wherein the third step includes forming reflective units on a surface of each of the second substrates so that a line connecting the centers of reflective units formed on surfaces of the respectively second substrates form a straight line when the second substrates are viewed from the outside toward a plane perpendicular to the first direction; wherein the straight line connecting the centers of the reflective units formed on the first substrates and the straight line connecting the centers of the reflective units formed on the second substrates are not parallel to each other; and wherein the fifth step includes cutting the optical means base material in directions parallel to the first direction along two parallel straight lines that allow the reflective units to be all included therebetween when the optical means base material is viewed toward a plane perpendicular to the first direction.

In this case, the plurality of first substrates may have the same shape, the plurality of second substrates may have the same shape, and the plurality of first substrates and the plurality of second substrates may have different shapes.

Furthermore, when the optical means base material is viewed toward a plane perpendicular to the first direction, the height of any one of both ends of the plurality of first substrates and both ends of the plurality of second substrates may be higher than that of the remaining end.

According to still another aspect of the present invention, there is provided a compact optical device for augmented reality having a straightly-arranged optical structure, the compact optical device including: an optical means configured to transmit at least part of real object image light therethrough toward the pupil of a user's eye; a first reflective means embedded and disposed inside the optical means, and configured to transfer augmented reality image light, which is image light corresponding to an image for augmented reality output from an image output unit, to an optical element; and the optical element embedded and disposed in the optical means to transfer the augmented reality image light, transferred from the first reflective means, to the pupil of the user's eye by reflecting the augmented reality image light toward the pupil; wherein the optical means has a first surface on which real object image light is incident, and a second surface through which the augmented reality image light transferred through the optical element and the real object image light are output toward the pupil of the user's eye; wherein the optical element is a diffractive optical element or a holographic optical element; wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis, the optical element is formed in a single plane shape, and is disposed inside the optical means so that at least two straight lines that are not parallel to each other appear bent in a connected form when the optical means is viewed toward a plane perpendicular to the z axis.

According to still another aspect of the present invention, there is provided a compact optical device for augmented reality having a straightly-arranged optical structure, the compact optical device including: an optical means configured to transmit at least part of real object image light therethrough toward the pupil of a user's eye; a first reflective means embedded and disposed inside the optical means, and configured to transfer augmented reality image light, which is image light corresponding to an image for augmented reality output from an image output unit, to a second reflective means; and the second reflective means including a plurality of reflective units embedded and disposed in the optical means to transfer the augmented reality image light, transferred from the first reflective means, to the pupil of the user's eye by reflecting the augmented reality image light toward the pupil; wherein the optical means has a first surface on which real object image light is incident, and a second surface through which the augmented reality image light transferred through the second reflective means and the real object image light are output toward the pupil of the user's eye; wherein the second reflective means includes a plurality of reflective units having a size of 4 mm or less that are embedded and disposed inside the optical means; wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis, the plurality of reflective units are arranged inside the optical means such that centers thereof are positioned on one single straight line when the optical means is viewed from the outside toward a plane perpendicular to the z-axis.

In this case, the second reflective means may include a plurality of second reflective means, and the plurality of second reflective means may be arranged in parallel at intervals along a direction of the z-axis.

According to still another aspect of the present invention, there is provided a compact optical device for augmented reality having a straightly-arranged optical structure, the compact optical device including: an optical means configured to transmit at least part of real object image light therethrough toward the pupil of a user's eye; a first reflective means embedded and disposed inside the optical means, and configured to transfer augmented reality image light, which is image light corresponding to an image for augmented reality output from an image output unit, to an optical element; and the optical element embedded and disposed in the optical means to transfer the augmented reality image light, transferred from the first reflective means, to the pupil of the user's eye by reflecting the augmented reality image light toward the pupil; wherein the optical means has a first surface on which real object image light is incident, and a second surface through which the augmented reality image light transferred through the optical element and the real object image light are output toward the pupil of the user's eye; wherein the optical element is a diffractive optical element or a holographic optical element; wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis, the optical element is formed in a single plane shape, and is disposed inside the optical means so that it appears as a single straight line form when the optical means is viewed toward a plane perpendicular to the z axis.

Advantageous Effects

According to the present invention, there may be provided the compact optical device for augmented reality in which an optical structure for transferring the augmented reality image light, output from an image output unit, to the pupil is formed in a straightly-arranged structure, thereby improving optical efficiency and simplifying the manufacturing process, and there may also be provided the method for manufacturing the optical means used in the same.

In addition, there may be provided the optical device for augmented reality that may significantly reduce the size, thickness, weight and volume thereof, may provide a wide field of view, and may minimize the leakage of real-world image light, which may generate a ghost image, toward a user's pupil, thereby maximizing a see-through property and also providing a clear virtual image.

BEST MODE

Embodiments according to the present invention will be described in detail below with reference to the accompanying drawings.

Figure 1:
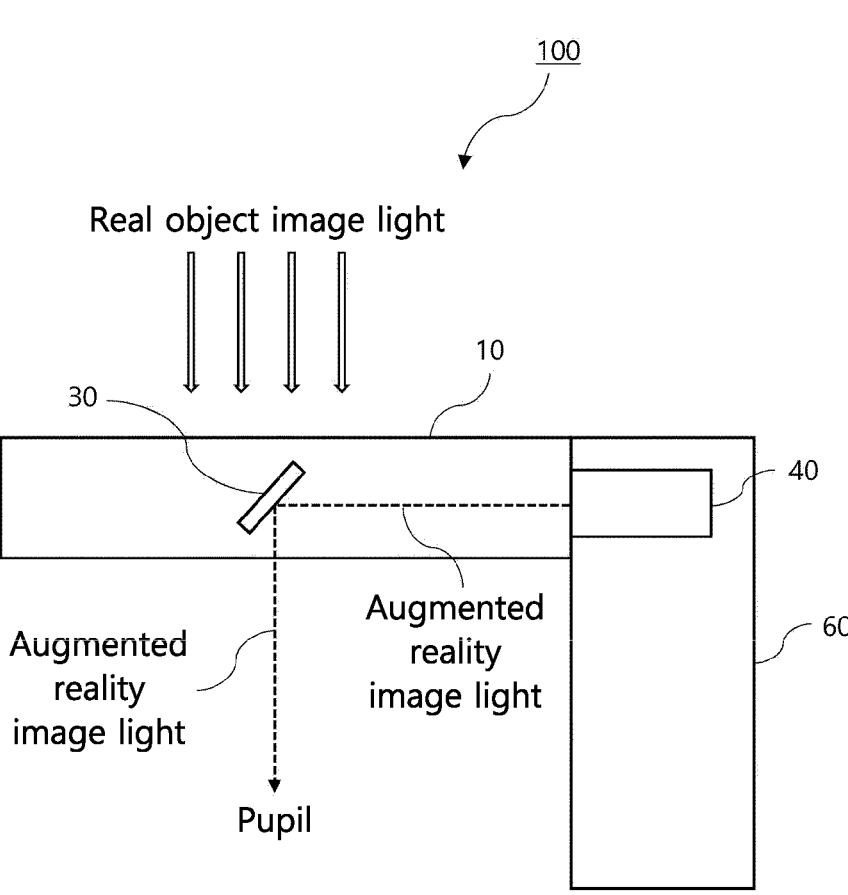
FIG. 1 is a diagram showing an optical device (100) for augmented reality as disclosed in patent document 1.
Figure 2:
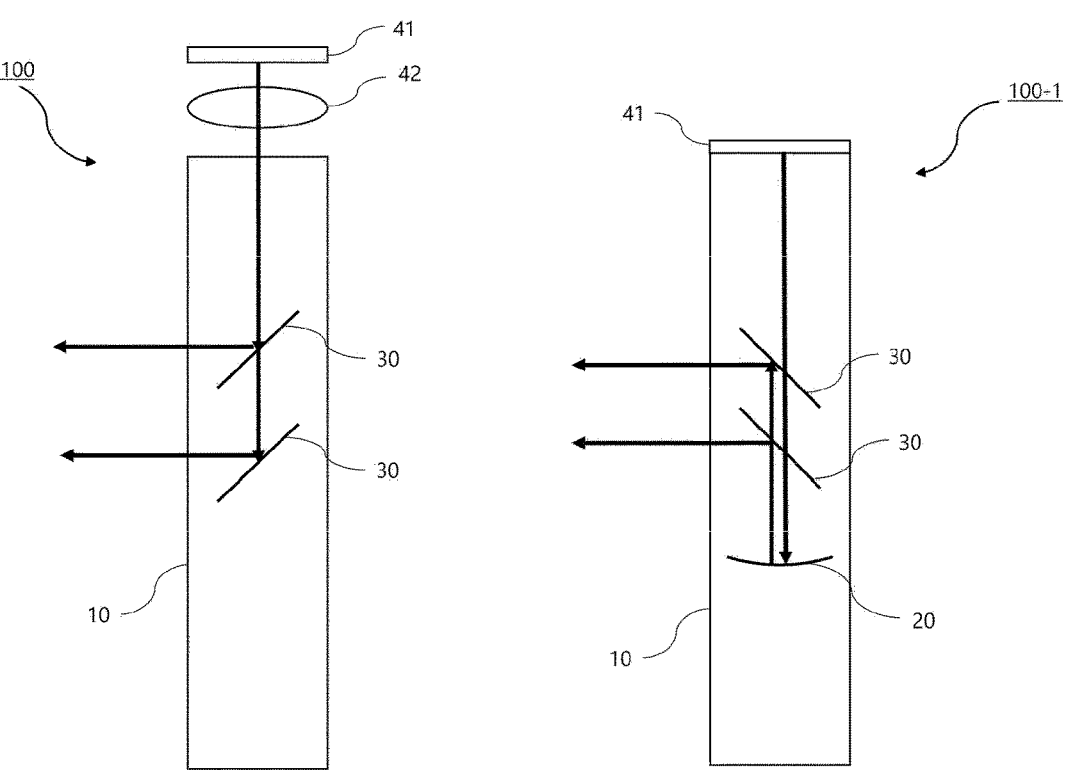
FIG. 2 shows the comparison between a side view of the optical device (100) for augmented reality of FIG. 1 in which a collimator is provided in an image output unit (40) and a side view of an optical device (100-1) for augmented reality in which an auxiliary reflective unit (20) functioning as a collimator is disposed.
Figure 3:
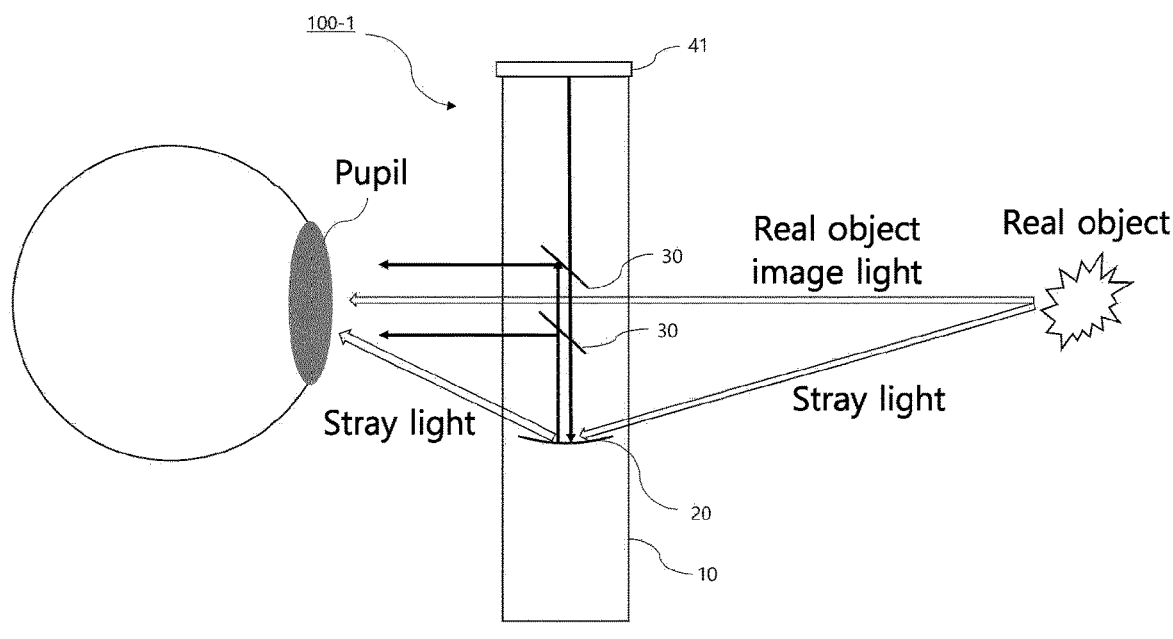
FIG. 3 is a diagram illustrating a phenomenon in which a ghost image is generated in the optical device (100-1) for augmented reality.
Figure 4:
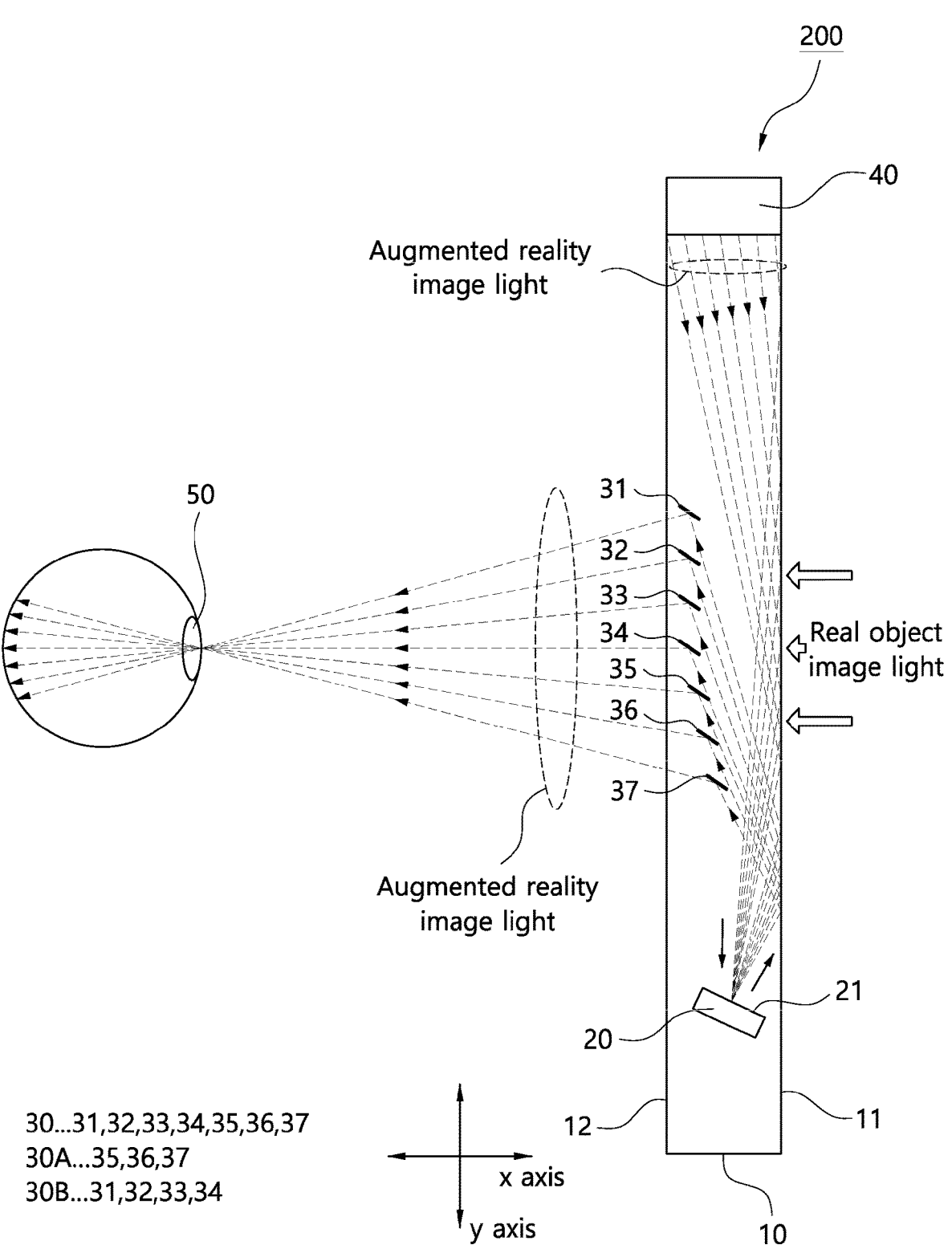
FIGS. 4 to 6 show a side view, perspective view, and front view of a compact optical device (200) for augmented reality having a straightly-arranged optical structure according to an embodiment of the present invention.
Figure 5:
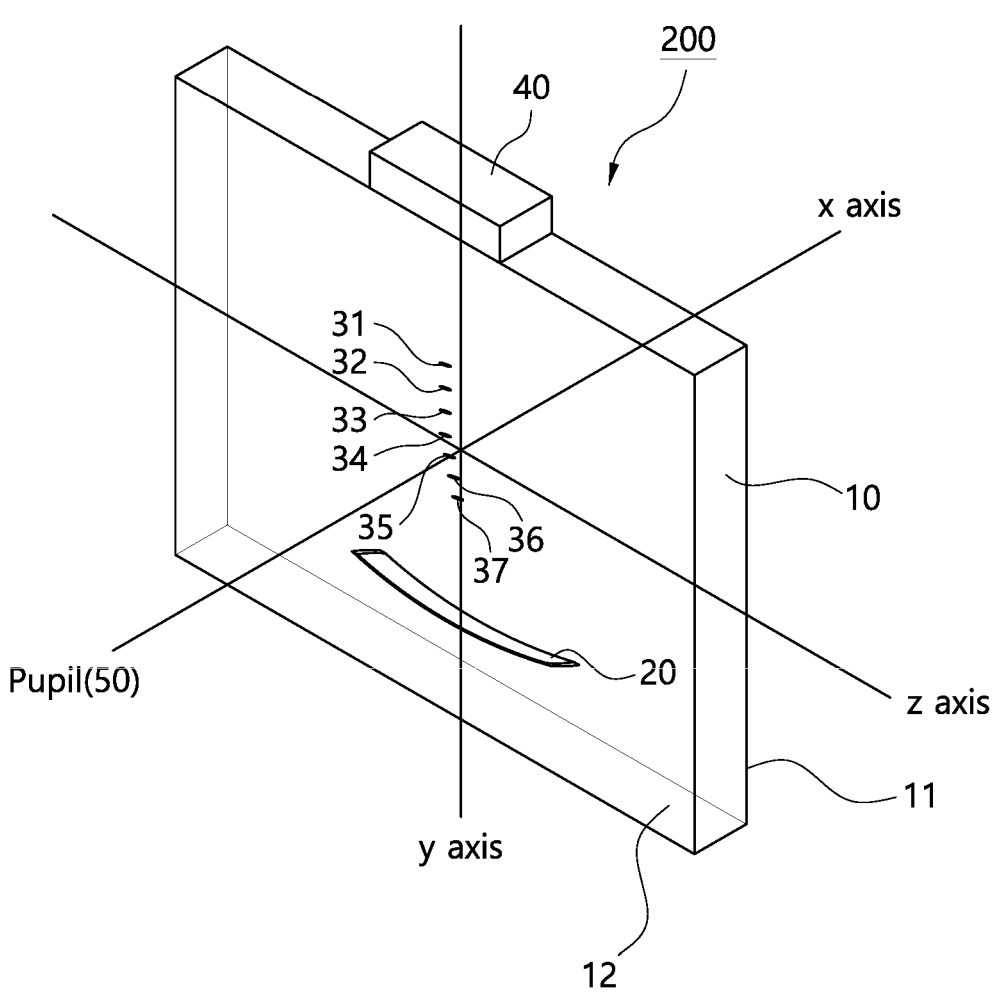
Figure 6:
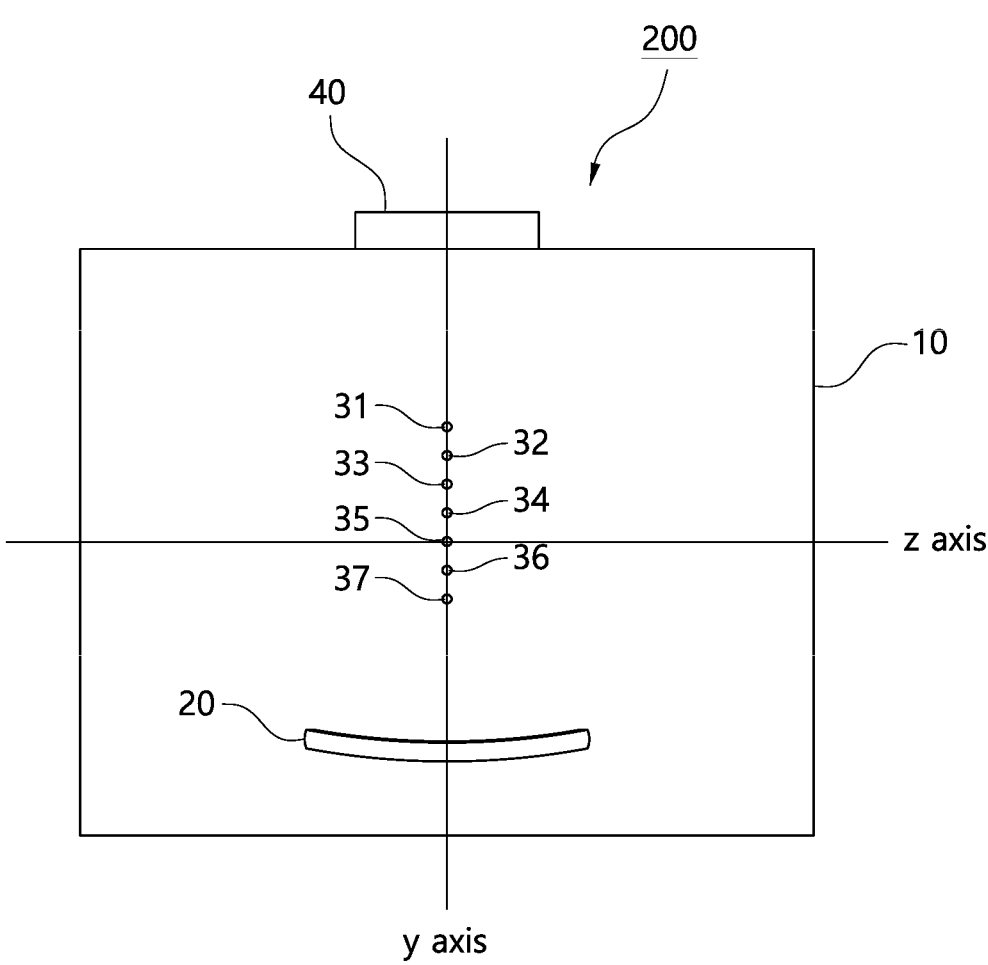

FIGS. 4 to 6 show a side view, perspective view, and front view of a compact optical device 200 for augmented reality having a straightly-arranged optical structure (hereinafter simply referred to as the "optical device 200 for augmented reality") according to an embodiment of the present invention.

Referring to FIGS. 4 to 6, the optical device 200 for augmented reality according to the present embodiment includes an optical means 10, a first reflective means 20, and a second reflective means 30.

The optical means 10 is a means for transmitting at least part of real object image light, which is image light output from a real object, therethrough toward the pupil 50 of the user's eye.

In this case, the fact that at least part of the real object image light is transmitted toward the pupil 50 implies that the optical transmittance of the real object image light does not necessarily need to be 100%.

The optical means 10 includes a first surface 11 and a second surface 12 that are disposed opposite each other. The first surface 11 is a surface on which real object image light is incident, and the second surface 12 is a surface through which augmented reality image light corresponding to an image for augmented reality reflected by the second reflective means 30 and real object image light passed through the first surface 11 are output toward the pupil 50 of the user's eye.

In the embodiment of FIGS. 4 to 6, the first and second surfaces 11 and 12 of the optical means 10 are arranged to be parallel to each other, but this is illustrative. It is obvious that the first and second surfaces 11 and 12 may be arranged not to be parallel to each other.

In FIGS. 4 to 6, dotted lines indicate the optical paths along which the augmented reality image light output from an image output unit 40 passes through the pupil 50 and reaches the retina.

As shown in the drawings, in the embodiment of FIGS. 4 to 6, the augmented reality image light output from the image output unit 40 is reflected by total internal reflection on the first surface 11 of the optical means 10, and is transferred to the first reflective means 20, and the augmented reality image light reflected by the first reflective means 20 is output toward the first surface 11, is reflected by total internal reflection on the first surface 11, and is transferred to the second reflective means 30.

Furthermore, the augmented reality image light reflected by the second reflective means 30 is output to the pupil 50 through the second surface 12 of the optical means 10 and reaches the retina through the pupil 50, thus forming an image for an image for augmented reality.

Although the augmented reality image light output from the image output unit 40 is shown as being reflected by total internal reflection on the first surface 11 of the optical means 10 once and transferred to the first reflective means 20 in the embodiment of FIGS. 4 to 6, this is illustrative. The augmented reality image light output from the image output unit 40 may be transferred to the first reflective means 20 without total internal reflection or through two or more total internal reflections.

In addition, although the augmented reality image light reflected by the first reflective means 20 is shown as being reflected by total internal reflection on the first surface 11 of the optical means 10 once and transferred to the second reflective means 30, this is also illustrative. It may be transferred to the second reflective means 30 without total internal reflection or through two or more total internal reflections.

In this case, the second reflective means 30 includes a plurality of reflective means 31 to 37. In this specification, the second reflective means 30 collectively refers to the plurality of reflective units 31 to 37. The detailed configuration of the second reflective means 30 will be described later.

The image output unit 40 is a means for outputting augmented reality image light, which is image light corresponding to an image for augmented reality. For example, the image output unit 40 may be a display device such as a small-sized LCD.

Since the image output unit 40 itself is not a direct target of the present invention and is known in prior art, a detailed description thereof will be omitted here. However, the image output unit 40 in the present embodiment does not include a component such as a collimator as described in the Background Art section above.

Meanwhile, the image for augmented reality refers to a virtual image that is transferred to a user's pupil 50 through the image output unit 40, the optical means 10, the first reflective means 20, and the second reflective means 30. For example, it may be a still or moving image in the form of an image.

The image for augmented reality is transferred to the user's pupil 50 by the image output unit 40, the optical means 10, the first reflective means 20, and the second reflective means 30, thus being provided to the user as a virtual image. At the same time, the user receives real object image light output from a real object present in the real world through the optical means 10, thereby receiving an augmented reality service.

Next, the first reflective means 20 will be described.

The first reflective means 20 is embedded and disposed in the optical means 10, and is a means for transferring augmented reality image light, output from the image output unit 40, to the second reflective means 30.

In the embodiment of FIGS. 4 to 6, as described above, the image output unit 40 outputs augmented reality image light toward the first surface 11 of the optical means 10, and the augmented reality image light reflected by total internal reflection on the first surface 11 is transferred to the first reflective means 20.

Thereafter, the augmented reality image light reflected by the first reflective means 20 is reflected by total internal reflection on the first surface 11 of the optical means 10 again, is transferred to the second reflective means 30, is reflected by the second reflective means 30 again, and is output toward the pupil 50.

As shown in FIGS. 4 to 6, the first reflective means 20 is embedded and disposed in the optical means 10 to face the image output unit 40 with the second reflective means 30 interposed therebetween.

In addition, the first reflective means 20 is embedded and disposed between the first and second surfaces 11 and 12 of the optical means 10 to transfer image light for augmented reality to the second reflective means 30.

In other words, the first reflective means 20 is disposed at an appropriate position in the inside the optical means 10 between the first and second surfaces 11 and 12 of the optical means 10 by taking into consideration the relative positions of the image output unit 40, the second reflective means 30, and the pupil 50 so that the augmented reality image light output from the image output unit 40 and reflected and entering by total internal reflection on the first surface 11 of the optical means 10 can be output toward the first surface 11 of the optical means 10 and the augmented reality image light reflected by total internal reflection on the first surface 11 of the optical means 10 can be transferred to the second reflective means 30.

To this end, in the embodiment of FIGS. 4 to 6, the first reflective means 20 is embedded and disposed inside the optical means 10 so that the reflective surface 21 of the first reflective means 20 that reflects augmented reality image light faces the surface on which the real object image light is incident, i.e., the first surface 11 of the optical means 10.

In this case, the fact that the first reflective means 20 is embedded and disposed inside the optical means 10 signifies that the ends of the first reflecting unit 20 are spaced apart from the first and second surfaces 11 and 12 of the optical means 10 and disposed inside the optical means 10.

With this arrangement structure, the first reflective means 20 outputs augmented reality image light toward the first surface 11, and stray light, which is output from a real object and may generate a ghost image, is prevented from being transferred to the pupil 50.

The reflective surface 21 of the first reflective means 20 may be formed as a curved surface. For example, the reflective surface 21 of the first reflective means 20 may be a concave mirror formed to be concave toward the first surface 11 of the optical means 10. With this configuration, the first reflective means 20 may serve as a collimator for collimating the augmented reality image light output from the image output unit 40. Therefore, it is not necessary to use a structure such as a collimator in the image output unit 40.

Figure 7:
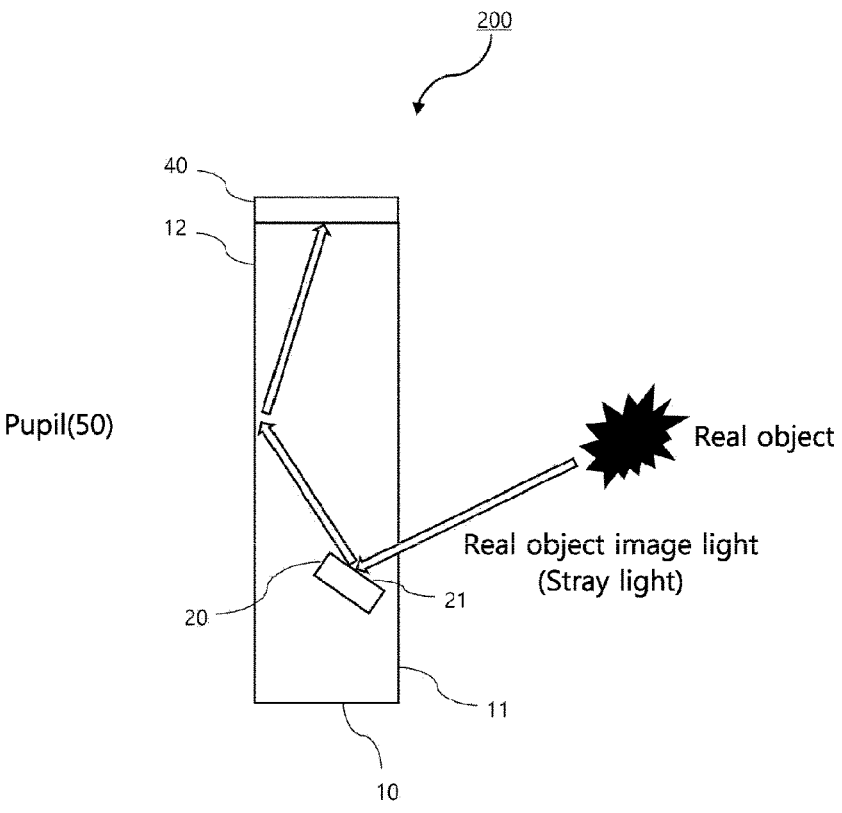
FIG. 7 is a diagram illustrating the principle based on which a first reflective means (20) blocks a ghost image.

FIG. 7 is a diagram illustrating the principle based on which the first reflective means 20 blocks a ghost image.

In FIG. 7, for convenience of description, the second reflective means 30 is omitted.

Referring to FIG. 7, as described above, the first reflective means 20 is disposed to face the first surface 11 of the optical means 10 on which real object image light is incident. Accordingly, it can be seen that the real object image light (stray light) that is output from a real object, is incident on the first reflective means 20 and may generate a ghost image is reflected from the reflective surface 21 of the first reflective means 20 disposed to be concave toward the first surface 11, is output toward the second surface 12 of the optical means 10, is reflected by total internal reflection on the second surface 12 of the optical means 10, and is transferred in the direction of the image output unit 40.

Accordingly, it can be seen that stray light that is output from a real object and may generate a ghost image is extinguished inside the optical means 10 and does not leak toward the pupil 50.

However, this principle illustratively describes the basic principle for preventing the real object image light (stray light) reflected from the first reflective means 20 from leaking out of the optical means 10. In reality, the position and direction of the first reflective means 20 need to be appropriately adjusted to minimize stray light reflected by the first reflective means 20 and entering the pupil 50 by taking into consideration the shape of the optical means 10, the refractive index, the positions of the eye and the first reflective means 20, the size of the pupil 50, eye relief, and/or the like.

Meanwhile, as will be described later, the size of the second reflective means 30 is formed to be 8 mm or less, which is the size of the average human pupil, and more preferably to 4 mm or less. In consideration of this point, the length of the first reflective means 20 in the widthwise direction is formed to be 8 mm or less, more preferably 4 mm or less, to correspond to the size of the second reflective means 30.

In this case, the widthwise direction of the first reflective means 20 refers to the direction between the first and second surfaces 11 and 12 of the optical means 10 in FIGS. 4 to 6. Referring to FIG. 5, the length of the first reflecting unit 20 in the widthwise direction corresponds to the length of the first reflective means 20 when the optical means 10 is viewed toward a plane perpendicular to the z axis.

Furthermore, it is preferable that the first reflective means 20 have a considerably thin thickness when viewed from the front through the pupil 50 so that a user cannot recognize it as much as possible.

Furthermore, the first reflective means 20 may be formed of a means such as a half mirror that partially reflects light.

Furthermore, the first reflective means 20 may be formed of a refractive or diffractive element other than a reflective means.

Furthermore, the first reflective means 20 may be formed of an optical element such as a notch filter that selectively transmits light therethrough depending on the wavelength thereof.

Moreover, the surface opposite to the reflective surface 21 of the first reflective means 20 configured to reflect augmented reality image light may be coated with a material that absorbs light without reflecting it.

Next, the second reflective means 30 will be described.

The second reflective means 30 is embedded and disposed inside the optical means 10, is a means for providing an image for augmented reality to a user by reflecting the augmented reality image light, transferred from the first reflective means 20, toward the pupil 50 of the user's eye to transfer the augmented reality image light to the pupil 50, and is formed of a plurality of reflective means 31 to 37.

In the embodiment of FIGS. 4 to 6, as described above, the augmented reality image light reflected by the first reflective means 20 is output toward the first surface 11 of the optical means 10, is reflected by total internal reflection on the first surface 11 of the optical means 10, and is then transferred to the second reflective means 30.

The plurality of reflective units 31 to 37 constituting the second reflective means 30 is embedded and disposed inside the optical means 10 to transfer the augmented reality image light, transferred from the first reflective means 20, to the pupil 50 of the user by reflecting the augmented reality image light.

In this case, the fact that the plurality of reflective units 31 to 37 constituting the second reflective means 20 are embedded and disposed inside the optical means 10 means that the ends of the plurality of reflective units 31 to 37 are spaced apart from the first and second surfaces 11 and 12 of the optical means 10 and disposed inside the optical means 10.

As described above, the augmented reality image light output from the image output unit 40 is transferred to the second reflective means 30 through the first reflective means 20 and the first surface 11 of the optical means 10, so that the plurality of reflective units 31 to 37 constituting the second reflective means 30 are each disposed to have an appropriate angle of inclination with respect to the second surface 12 of the optical means 10 by taking into consideration the positions of the first reflective means 20 and the pupil 50.

As described in the Background Art section above, each of the reflective units 31 to 37 is formed to have a size smaller than the size of a human pupil, i.e., 8 mm or less, more preferably 4 mm or less, in order to obtain a pinhole effect by increasing the depth of field.

In other words, each of the plurality reflective units 31 to 37 is formed to have a size smaller than the common pupil size of people. Accordingly, the depth of field for the light incident onto the pupil 50 through each of the reflective units 31 to 37 may be made almost infinite, i.e., considerably deep. Therefore, there may be achieved a pinhole effect that allows an image for augmented reality to be always recognized as being in focus regardless of a change in the focal length even when a user changes the focal length for the real world while gazing at the real world.

In this case, the size of each of the plurality of reflective units 31 to 37 is defined as the maximum length between any two points on the edge boundary line of each of the reflective units 31 to 37.

Furthermore, the size of each of the plurality of reflective units 31 to 37 may be the maximum length between any two points on the edge boundary of an orthographic projection obtained by projecting each of the reflective units 31 to 37 onto a plane that is perpendicular to a straight line between the pupil 50 and the reflective units 31 to 37 and includes the center of the pupil 50.

Meanwhile, in the present invention, when the size of the reflective units 31 to 37 is excessively small, the diffraction phenomenon in the reflective units 31 to 37 increases, so that the size of each of the reflective units 31 to 37 is preferably larger than, e.g., 0.3 mm.

Furthermore, it is preferable that each of the reflective units 31 to 37 has a circular shape. In this case, the shape of the reflective units 31 to 37 may be formed to appear circular when viewed from the pupil 50 to the reflective units 31 to 37.

Meanwhile, each of the plurality of reflective units 31 to 37 is disposed such that the augmented reality image light transferred from the first reflective means 20 is not blocked by the other reflective units 31 to 37. To this end, the second reflective means 30 and the plurality of reflective units 31 to 37 are configured as follows.

First, when the optical means 10 is placed in front of the user's pupil 50 and a forward direction from the pupil 50 is set as the x axis as shown in FIGS. 4 to 6, the image output unit 40 is disposed outside or inside the optical means 10 in order to be placed on any one of the straight lines orthogonal to the x axis.

In this case, when any one of the line segments passing between the first and second surfaces 11 and 12 of the optical means 10 while being parallel to a vertical line extending from the image output unit 40 to the x axis along the x axis is set as the y axis and a line segment orthogonal to the x axis and the y axis is set as the z axis, at least two 35 to 37 of the plurality of reflective units 31 to 37 form a first reflective unit group 30A disposed inside the optical means 10 so that the centers thereof are located on one straight line (which is referred to as a "first straight line") when the optical means 10 is viewed from the outside toward a plane perpendicular to the z axis.

Furthermore, at least two 31 to 34 of the remaining reflective units 31 to 33, excluding the reflective units 35 to 37 forming the first reflective unit group 30A, form a second reflective unit group 30B disposed inside the optical means 10 so that the centers thereof are located on another straight line (which is referred to as a "second straight line") that is not parallel to the first straight line when the optical means 10 is viewed from the outside toward a plane perpendicular to the z axis.

In this case, the reflective units 35 to 37 constituting the first reflective unit group 30A are disposed closer to the second surface 12 of the optical means 10 as the distance from the first reflective means 20 increases.

Furthermore, the reflective units 31 to 34 constituting the second reflective unit group 30B may be disposed to have the same distance to the second surface 12 of the optical means 10 regardless of the distance from the first reflective means 20, and may be disposed farther from the second surface 12 of the optical means 10 as the distance from the first reflective means 20 increases.

In this case, there may be a case where at least one of the first and second surfaces 11 and 12 of the optical means 10 is formed as a curved surface or is formed to have an angle of inclination with respect to a plane perpendicular to a straight line (the x-axis) in a forward direction from the center of the pupil 50 rather than to be parallel to the plane. Accordingly, the fact that the reflective units 35 to 37 are disposed closer to the second surface 12 of the optical means 10 as the distance from the first reflective means 20 increases means that they are disposed closer to a vertical plane present between the second surface 12 and the pupil 50, which is a vertical plane perpendicular to the straight line in the forward direction from the pupil 50, as the distance from the first reflective means 20 increases.

In the same manner, the fact that the reflective units 31 to 34 is disposed farther to the second surface 12 of the optical means 10 as the distance from the first reflective means 20 increases means that they are disposed farther from a vertical plane present between the second surface 12 and the pupil 50, which is a vertical plane perpendicular to the straight line in the forward direction from the pupil 50, as the distance from the first reflective means 20 increases.

In this case, the first and second straight lines may be included in any one plane perpendicular to the z axis. This implies that the plurality of reflective units 31 to 37 forming the first and second reflective unit groups 30A and 30B are disposed inside the optical means 10 to be all included in any one identical plane perpendicular to the z axis.

In other words, referring to the embodiment of FIGS. 4 to 6, when the optical means 10 is placed in front of the pupil 50 and the optical means 10 is viewed from the outside toward a plane perpendicular to the z axis as shown in FIG. 4 (when the optical means 10 is viewed in the direction of the paper in FIG. 4), a line connecting the centers of the reflective units 35 to 37 constituting the reflective unit group 30A forms the first straight line, a line connecting the centers of the reflective units 31 to 34 constituting the reflective unit group 30B also forms the second straight line, and the first and second straight lines are arranged not to be parallel to each other.

Furthermore, the second reflective unit group 30B is disposed farther from the first reflective means 20 than the first reflective unit group 30A. This means that in FIG. 4, the first reflective unit group 30A is positioned lower than the second reflective unit group 30B and disposed closer to the first reflective means 10.

Meanwhile, in FIGS. 4 to 6, the individual reflective units 35 to 37 constituting the first reflective unit group 30A are shown as being successively formed by the adjacent reflective units 35 to 37, but this is illustrative. For example, the first reflective unit group 30A may be formed of non-adjacent reflective units. The same also applies to the second reflective unit group 30B.

Furthermore, it is obvious that at least one of the first and second reflective unit groups 30A and 30B may include a plurality of reflective unit groups.

Furthermore, all of the plurality of reflective units 31 to 37 constituting the second reflective means 30 do not necessarily need to be included in any one of the first and second reflective unit groups 30A and 30B. It is obvious that only some of the plurality of reflective units 31 to 37 constituting the second reflective means 30 may constitute the first and second reflective unit groups 30A and 30B.

Figure 8:
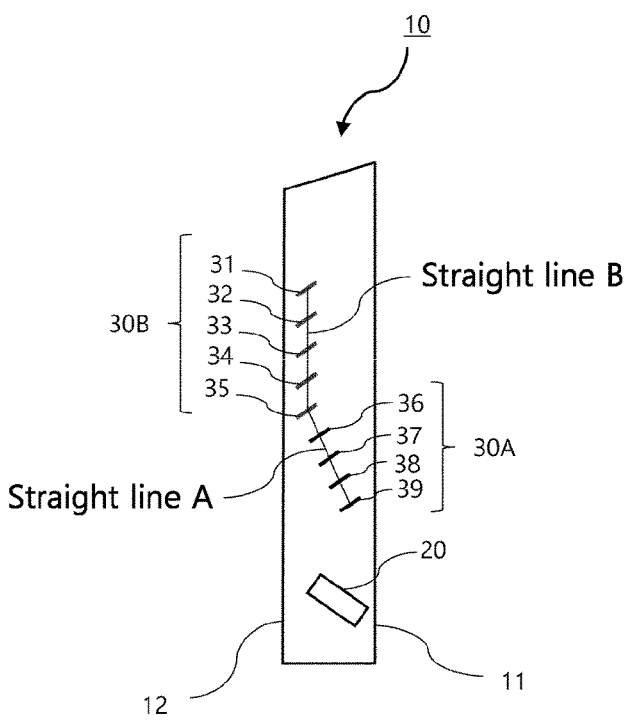
FIG. 8 is a diagram illustrating an arrangement structure of reflective units (31 to 39) described with reference to FIGS. 4 to 6.

FIG. 8 is a diagram illustrating an arrangement structure of the reflective units 31 to 39 described with reference to FIGS. 4 to 6. In FIG. 8, for convenience of description, the nine reflective units 31 to 39 are shown as being disposed.

Referring to FIG. 8, as described above, the second reflective means 30 includes a set of two reflective unit groups, i.e., the first reflective unit group 30A and the second reflective unit group 30B, the first reflective unit group 30A includes the plurality of reflective units 36 to 39, and the second reflective unit group 30B includes the plurality of reflective units 31 to 35.

As shown in FIG. 8, it can be seen that a straight line A (a first straight line) is formed when the centers of the reflective units 36 to 39 constituting the first reflective unit group 30A are connected with an imaginary line, a straight line B (a second straight line) is formed when the centers of the reflective units 31 to 35 constituting the second reflective unit group 30B are connected with an imaginary line, and the reflective units 31 to 39 are disposed in the space between the first and second surfaces 11 and 12 inside the optical means 10 so that the straight lines A and B are not parallel to each other.

In this case, it can be seen that the reflective units 36 to 39 constituting the first reflective unit group 30A are arranged closer to the second surface 12 of the optical means 10 as the distance from the first reflective means 20 increases and the reflective units 31 to 35 constituting the second reflective unit group 30B are arranged to have the same distance from the second surface 12 of the optical means 10 regardless of the distance from the first reflective means 20.

Although a case where the second reflective means 30 is composed of the two reflective unit groups 30A and 30B has been shown in FIG. 8, this is illustrative. It is obvious that the second reflective means 30 may be composed of three or more reflective unit groups and three or more straight lines connecting the centers of the reflective units 31 to 39 may be formed.

Figure 9:
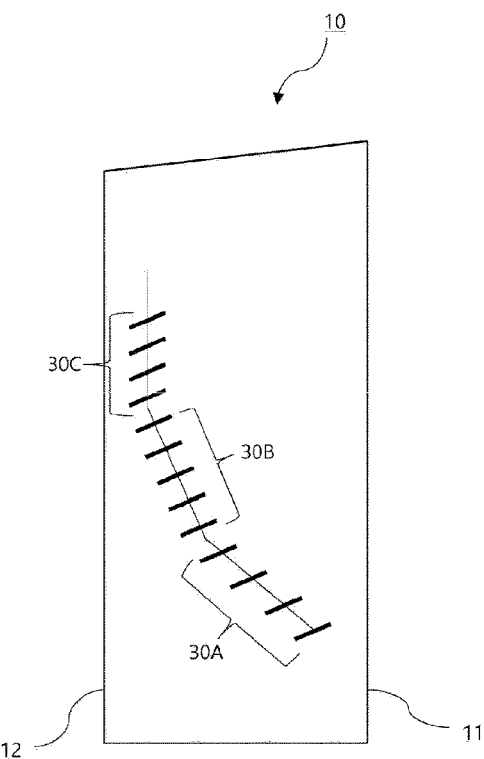
FIGS. 9 and 10 show other arrangement structures of a second reflective means (30)
Figure 10:
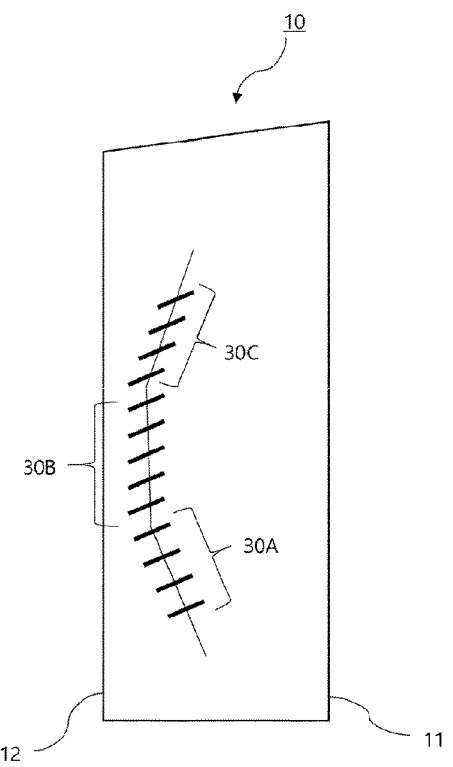

FIGS. 9 and 10 show other arrangement structures of the second reflective means 30.

In FIG. 9, for convenience of description, the first reflective means 20 is omitted, and only the second reflective means 30 is shown.

Referring to FIG. 9, it can be seen that the second reflective means 30 is composed of a set of three reflective unit groups 30A, 30B, and 30C and the reflective units constituting the reflective unit groups 30A, 30B, and 30C are arranged such that lines connecting the centers of the respective reflective units form three straight lines not parallel to each other when viewed from a side of the optical means 10, i.e., when the optical means 10 is viewed toward a plane perpendicular to the z axis.

In this case, it can be seen that the reflective units constituting the reflective unit group 30C are arranged to have the same distance to the second surface 12 of the optical means 10 regardless of the distance from the first reflective means 20, whereas the reflective units constituting the reflective unit group 30B are arranged closer to the second surface 12 of the optical means 10 as the distance from the first reflective means 20 increases, like the reflective units constituting the reflective unit group 30A.

This case may be considered to be a case where there are a plurality of reflective groups 30A each composed of reflective units that are arranged closer to the second surface 12 of the optical means 10 as the distance from the first reflective means 20 increases. However, even in this case, the straight lines constituting the respective reflective unit groups 30A and 30B are arranged not to be parallel to each other.

Even in FIG. 10, it can be seen that the second reflective means 30 is composed of a set of three reflective unit groups 30A, 30B, and 30C and all the reflective units constituting the individual reflective unit groups 30A, 30B, and 30C are arranged such that lines connecting the centers of the reflective units form three straight lines when viewed from a side of the optical means 10.

In FIG. 10, the reflective units constituting the reflective unit group 30A are disposed closer to the second surface 12 of the optical means 10 as the distance from the first reflective means 20 increases, whereas the reflective units constituting the reflective unit group 30B are arranged to have the same distance from the second surface 12 of the optical means 10 regardless of the distance from the first reflective means 20.

In addition, it can be seen that the reflective units constituting the reflective unit group 30C are disposed farther from the second surface 12 of the optical means 10 as the distance from the first reflective means 20 increases.

Meanwhile, in the above embodiments, it is preferable that the reflective units be disposed such that the straight lines connecting the centers of the reflective units of the individual reflective unit groups 30A, 30B, and 30C are connected to each other, but the straight lines do not necessarily need to be connected to each other.

Meanwhile, although the augmented reality image light output from the image output unit 40 is described as being reflected by total internal reflection on the first surface 11 of the optical means 10 once and then transferred to the first reflective means 20 in the embodiment of FIGS. 4 to 6, a configuration without total internal reflection or configuration in which total internal reflection is performed two or more times may also be possible.

Although the augmented reality image light is described as being reflected by total internal reflection on the first surface 11 of the optical means 10 once between the first reflective means 20 and the second reflective means 30 in the embodiment of FIGS. 4 to 6, a configuration in which the augmented reality image light is directly transferred or a configuration in which the augmented reality image light is transferred through two or more total internal reflections may also be possible.

FIGS. 11 to 16 are diagrams illustrating total internal reflection structures inside the optical means 10.

Figure 11:
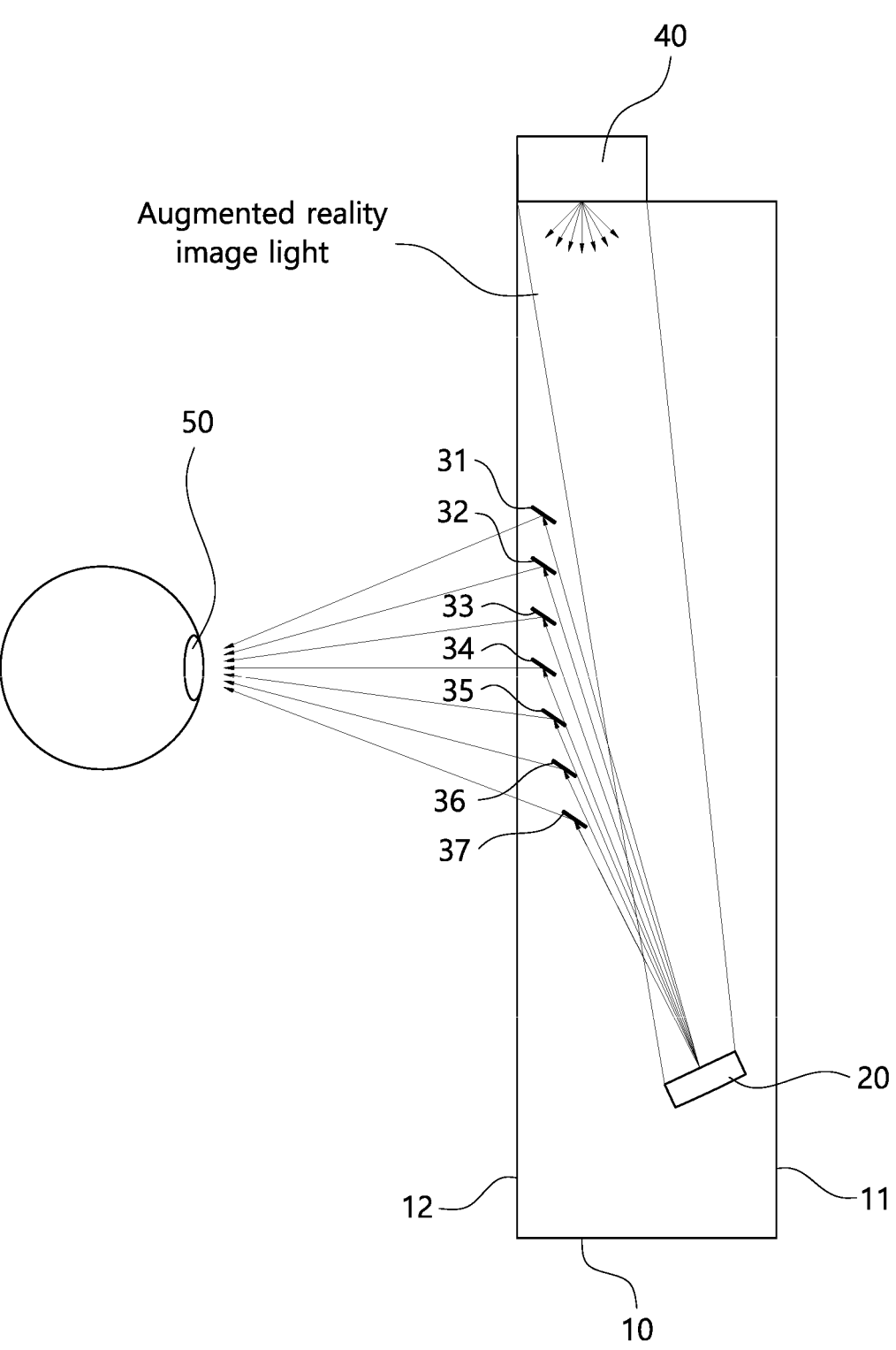
FIGS. 11 to 16 are diagrams illustrating total internal reflection structures inside the optical means (10)

FIG. 11 shows a case in which total internal reflection does not occur on the inner surfaces of the optical means 10. As shown in the drawing, it can be seen that the augmented reality image light output from the image output unit 40 is directly transferred to the first reflective means 20 through the inside of the optical means 10 without total internal reflection. Furthermore, the augmented reality image light reflected by the first reflective means 20 is directly transferred to the second reflective means 30, i.e., the plurality of reflective units 31 to 37, and is reflected by the individual reflective units 31 to 37 and transferred to the pupil 50.

Figure 12:
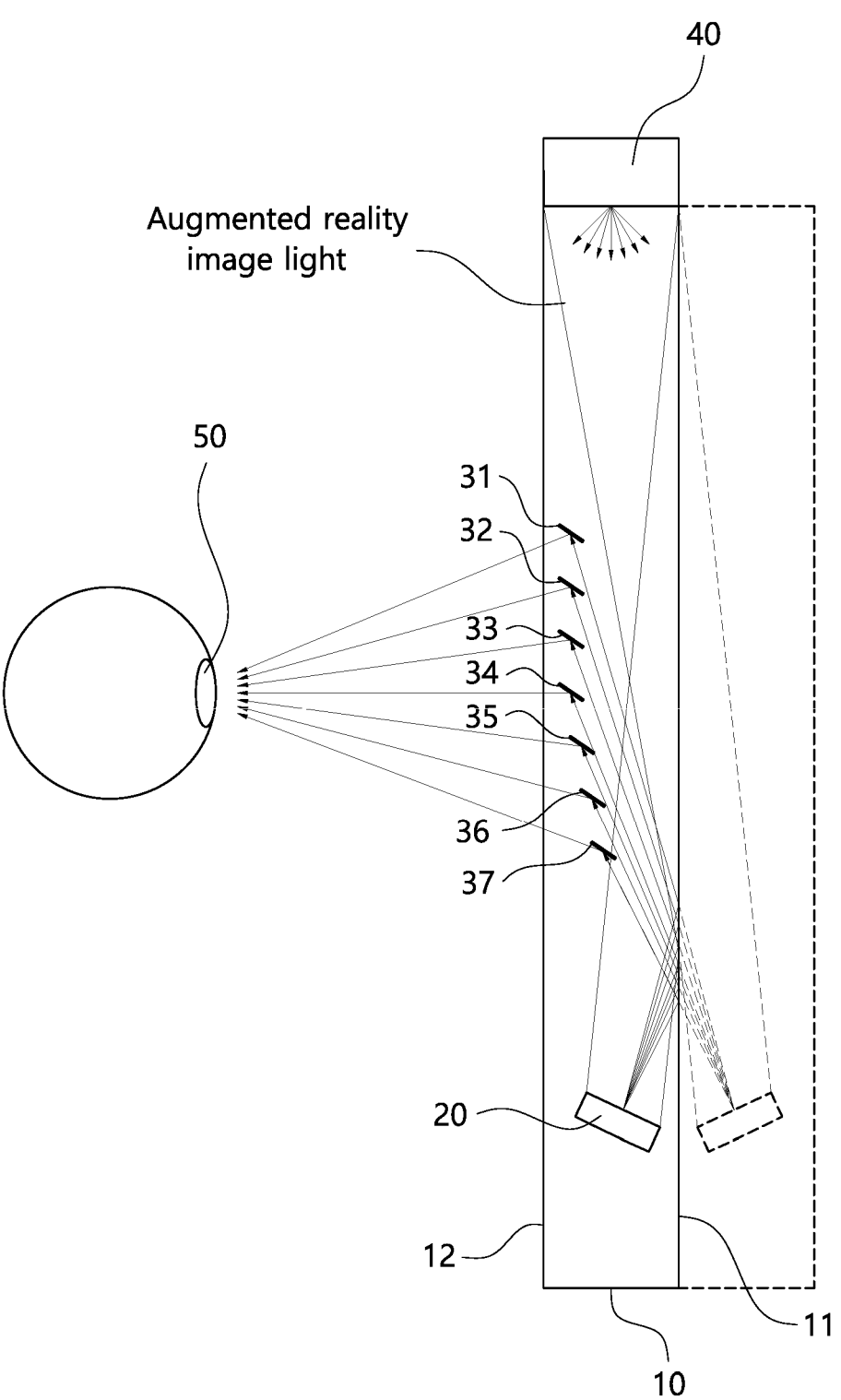

FIG. 12 shows a case where total internal reflection occurs twice on the inner surfaces of the optical means 10. As shown in the drawing, it can be seen that the augmented reality image light output from the image output unit 40 is reflected by total internal reflection on the first surface 11 of the optical means 10 and transferred to the first reflective means 20. Furthermore, the augmented reality image light reflected by the first reflective means 20 is output toward the first surface 11 of the optical means 10 again, is reflected by total internal reflection on the first surface 11 again and then transferred to the second reflective means 30, and is reflected therefrom again and transferred to the pupil 50.

FIG. 12 is the same as the embodiment described with reference to FIGS. 4 to 6. It can be seen that the example of FIG. 12 is substantially the same as an example obtained by bisecting the optical means 10 of FIG. 11 on the x axis such as that described with reference to FIGS. 4 to 6, setting a bisector to the first surface 11, and then symmetrically moving the first reflective means 20 of FIG. 11 with respect to the bisector.

Figure 13:
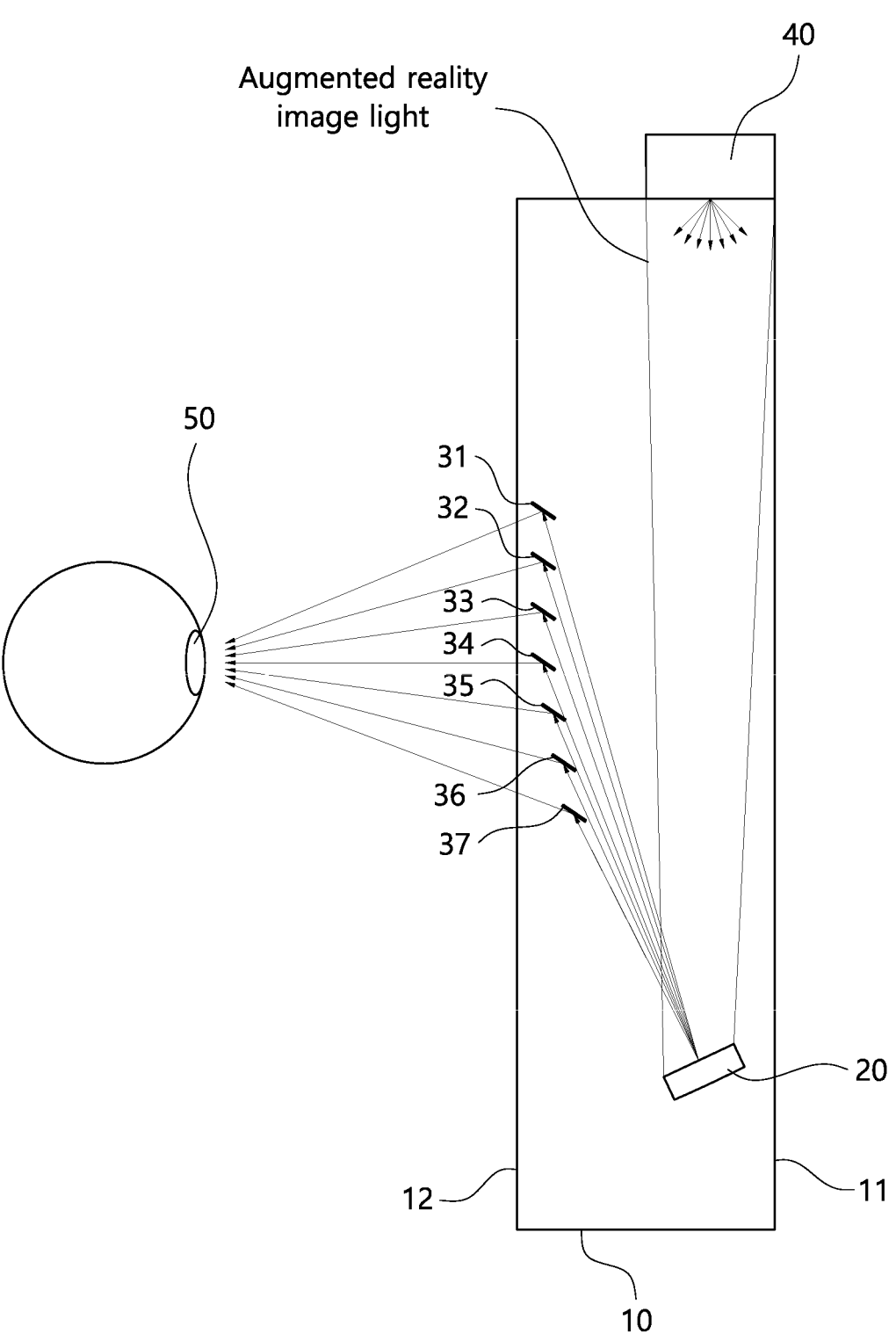

FIG. 13 shows another case where total internal reflection does not occur on the inner surfaces of the optical means 10. As shown in the drawing, it can be seen that the augmented reality image light output from the image output unit 40 is directly transferred to the first reflective means 20 through the inside of the optical means 10 without total reflection. Furthermore, the augmented reality image light reflected by the first reflective means 20 is directly transferred to the second reflective means 30, i.e., the plurality of reflective units 31 to 37, and is then reflected by the plurality of reflective units 31 to 37 and transferred to the pupil 50. Although the example of FIG. 13 is similar to that of FIG. 11, there are differences in the position of the image output unit 40 and the position of the first reflective means 20.

Figure 14:
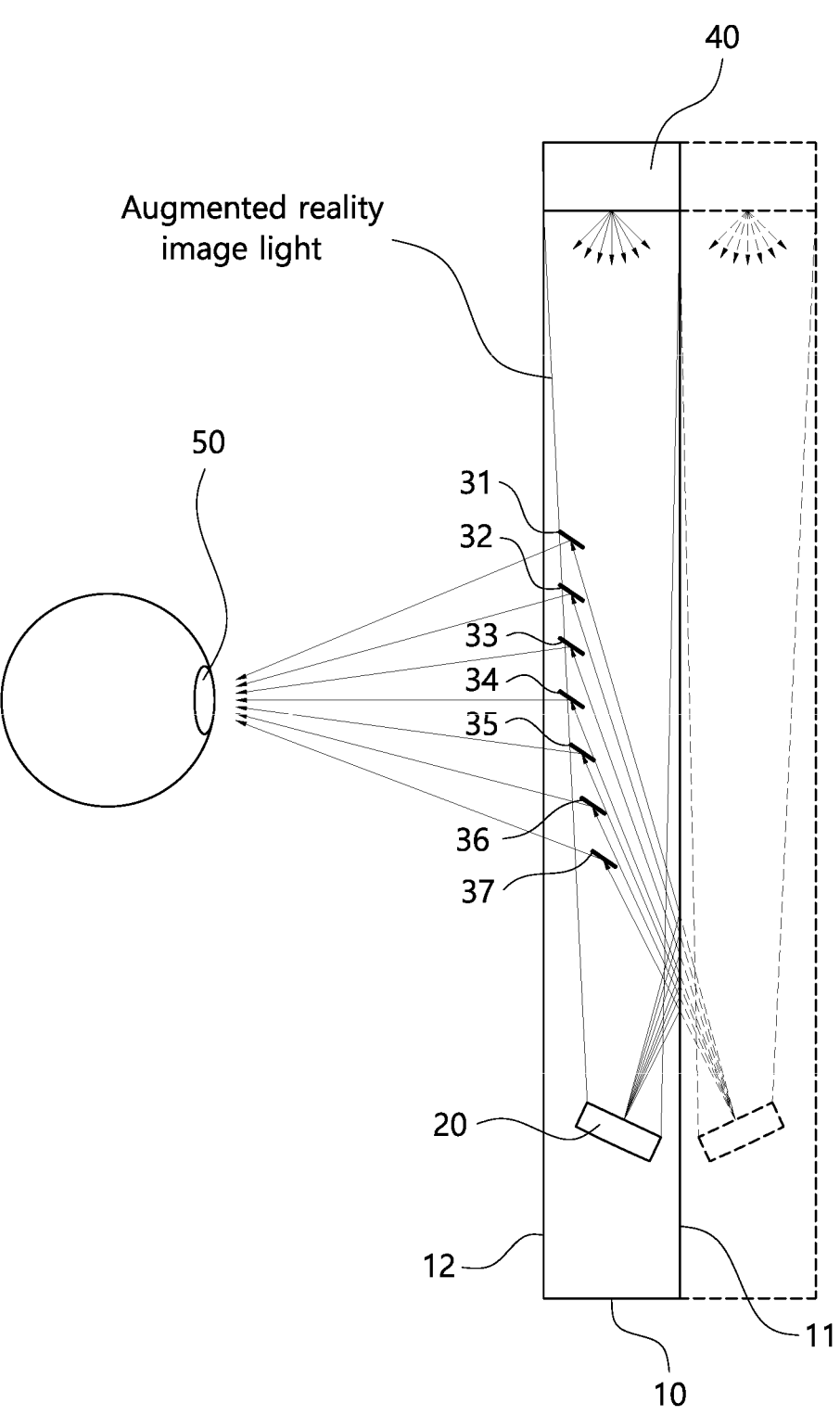

FIG. 14 shows another case where total internal reflection occurs once on an inner surface of the optical means 10. As shown in the drawing, it can be seen that the augmented reality image light output from the image output unit 40 is directly transferred to the first reflective means 20. Furthermore, the augmented reality image light reflected by the first reflective means 20 is output toward the first surface 11 of the optical means 10, is reflected by total internal reflection on the first surface 11 and then transferred to the second reflecting means 30, and is reflected therefrom again and transferred to the pupil 50.

It can be seen that the example of FIG. 14 is substantially the same as an example obtained by bisecting the optical means 10 on the x axis when the optical means 10 of FIG. 13 is viewed in the z-axis direction as described with reference to FIGS. 4 to 6, setting a bisector to the first surface 11, and symmetrically moving the first reflective means 20 of FIG. 13 with respect to the bisector.

Figure 15:
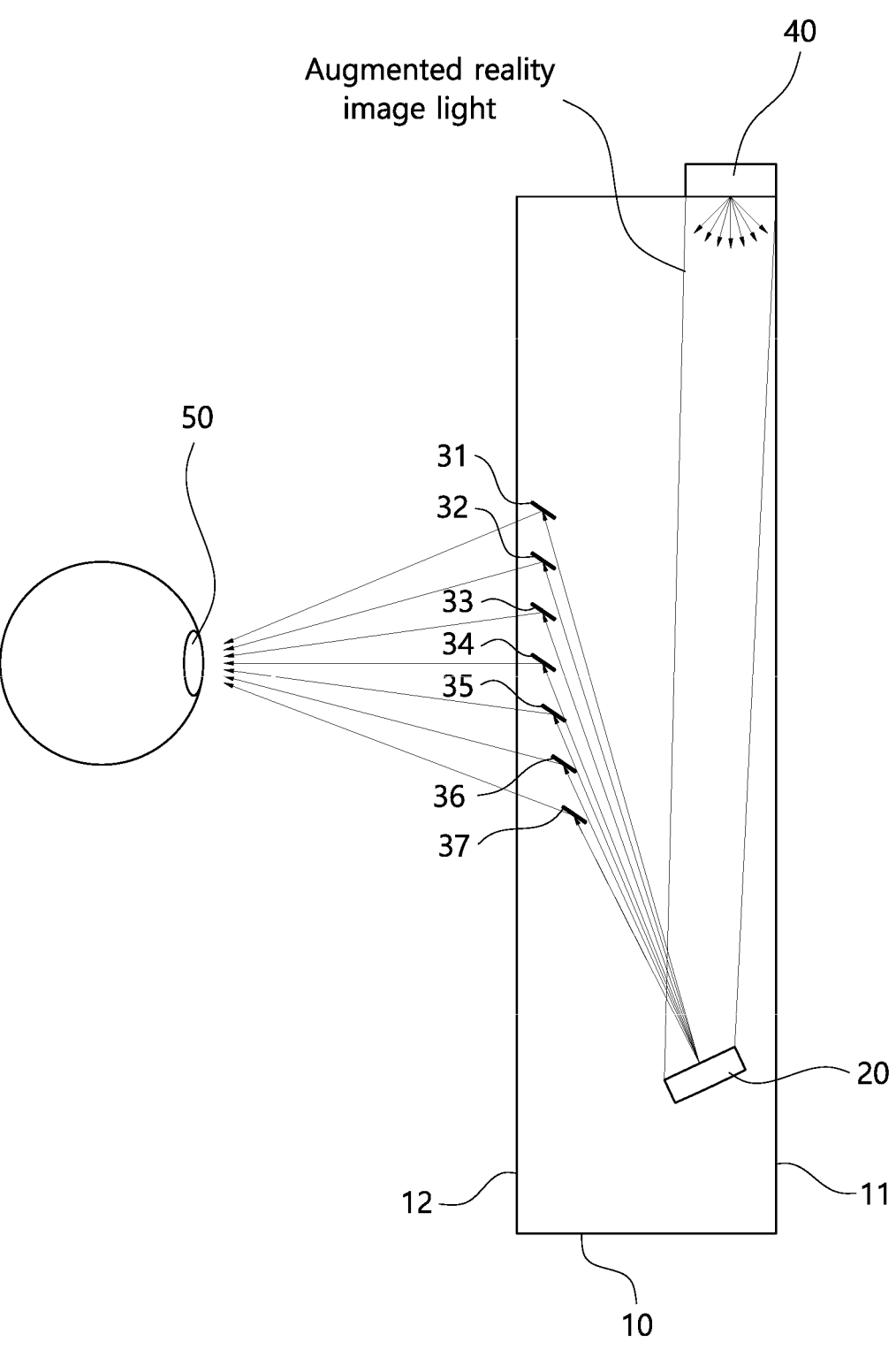

FIG. 15 shows still another example in which total internal reflection does not occur on the inner surfaces of the optical means 10. As shown in the drawing, the augmented reality image light output from the image output unit 40 is directly transferred to the first reflective means 20 through the inside of the optical means 10 without total internal reflection. Furthermore, the augmented reality image light reflected by the first reflective means 20 is directly transferred to the second reflective means 30, i.e., the plurality of reflective units 31 to 37, and is reflected again and transferred to the pupil 50. Although the example of FIG. 15 is similar to the examples of FIGS. 11 and 13, there are differences in the position and size of the image output unit 40 and the position and angle of the first reflective means 20.

Figure 16:
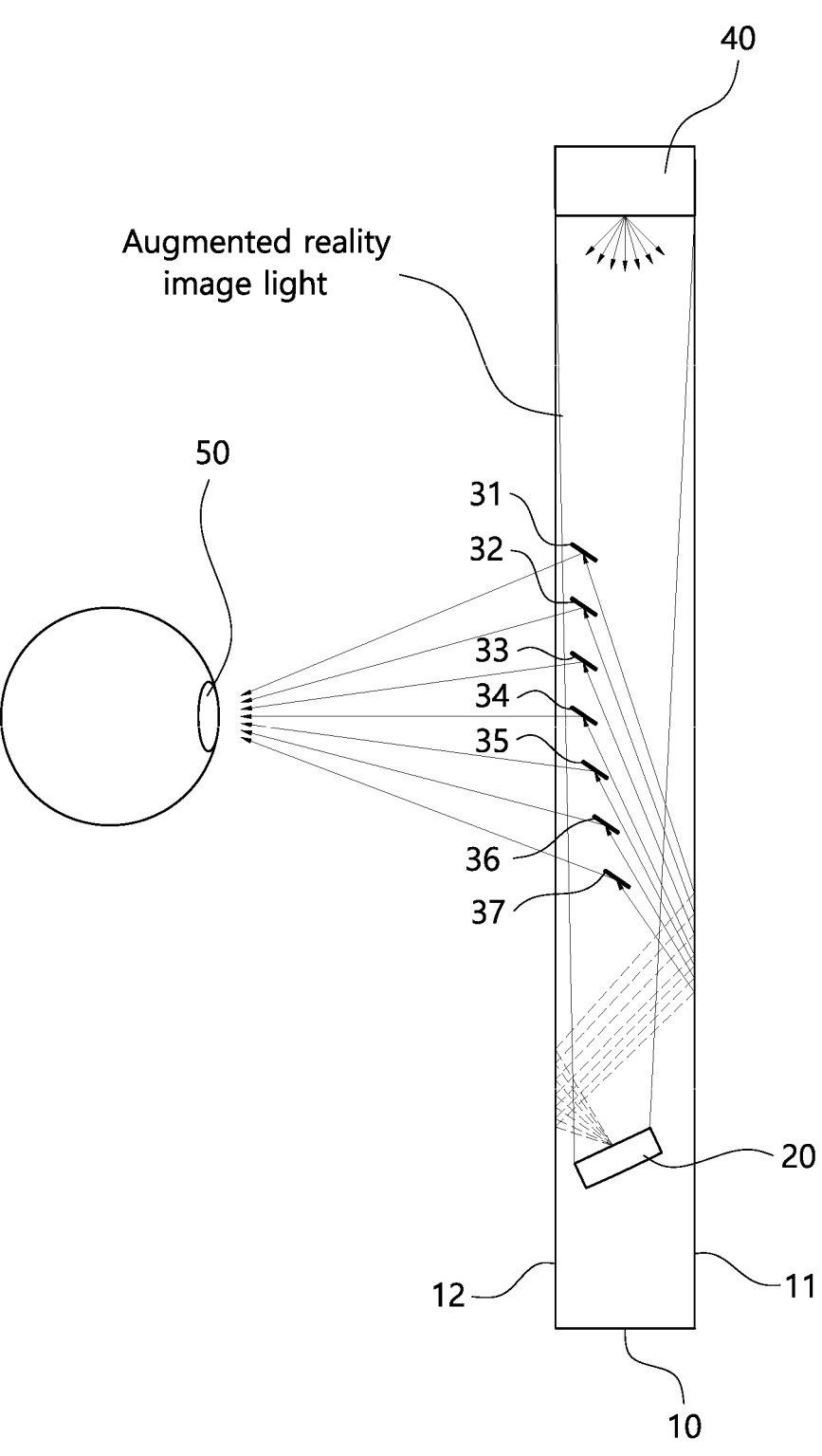

FIG. 16 shows still another case where total internal reflection occurs twice on the inner surfaces of the optical means 10. As shown in the drawing, it can be seen that the augmented reality image light output from the image output unit 40 is directly transferred to the first reflective means 20. Furthermore, the augmented reality image light reflected by the first reflective means 20 is output toward the second surface 12 of the optical means 10, is reflected by total internal reflection on the second surface 12 and then transferred to the first surface 11, is reflected by total internal reflection on the first surface 11 again and transferred to the second reflective means 30, and is reflected therefrom again and transferred to the pupil 50.

It can be seen that the example of FIG. 16 is substantially the same as an example obtained by trisecting the optical means 10 on the x axis when the optical means 10 of FIG. 15 is viewed in the z-axis direction as described with reference to FIGS. 4 to 6, setting one of trisectors, closest to the pupil 50, to the first surface 11, and symmetrically moving the first reflective means 20 of FIG. 15 twice with respect to the trisector.

FIGS. 11 to 16 illustrate structures in which there is no total internal reflection or total internal reflection occurs at least once inside the optical means 10. The present invention is not limited thereto, and it is obvious that other various structures capable of transferring augmented reality image light to the first reflective means 20 and the second reflective means 30 through other numbers of total internal reflections may be possible.

Figure 17:
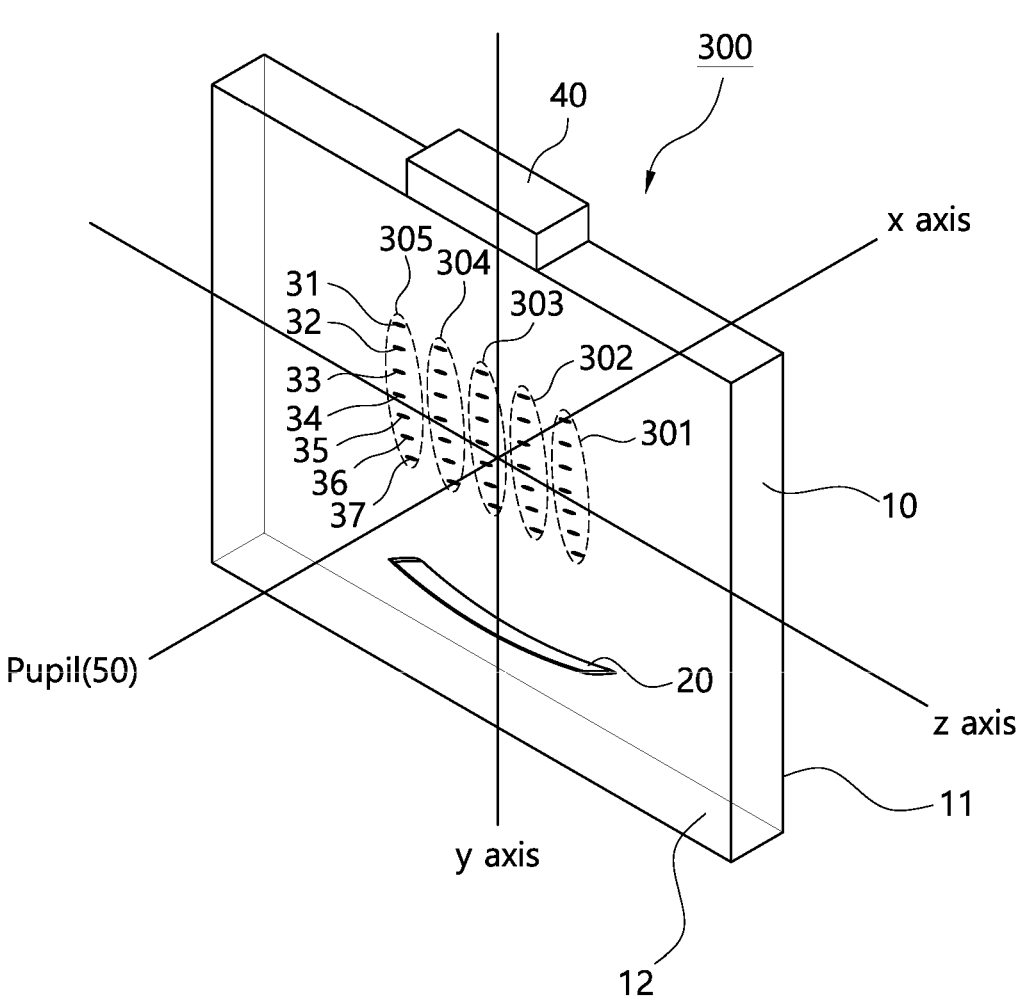
FIGS. 17 and 18 are a perspective view and front view of an optical device (300) for augmented reality according to another embodiment of the present invention.
Figure 18:
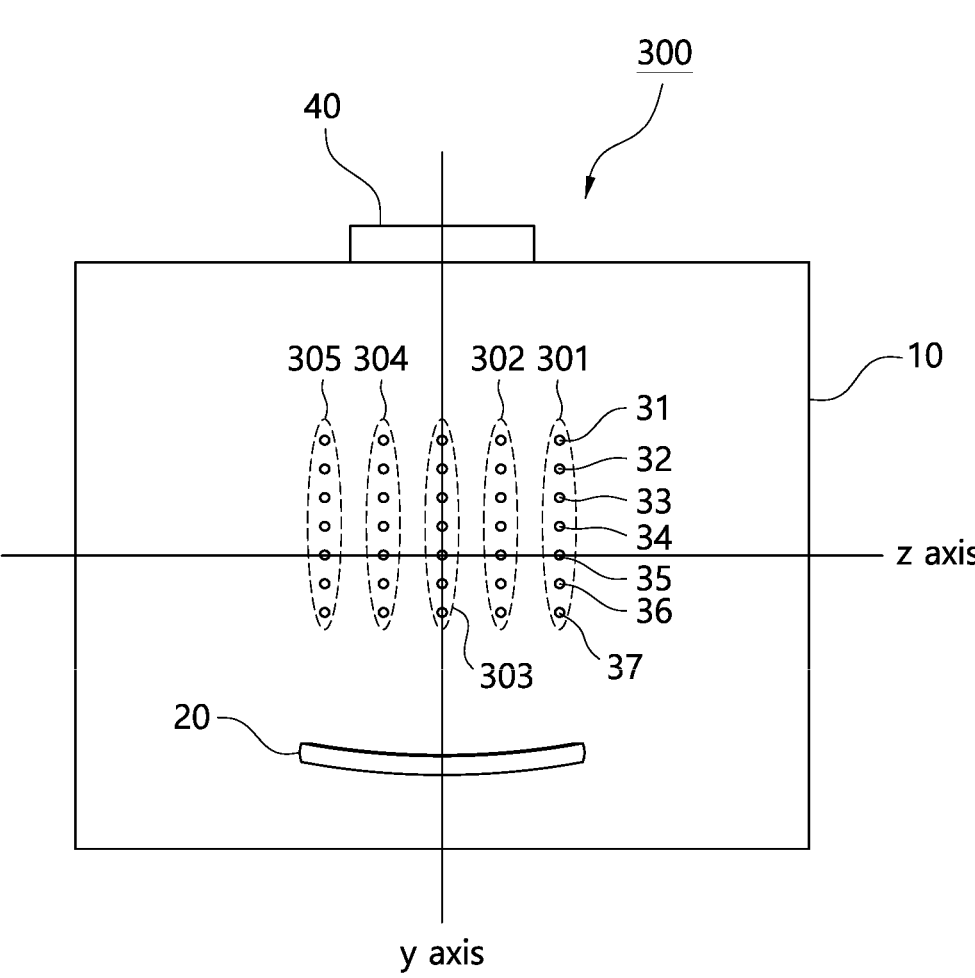

FIGS. 17 and 18 are diagrams showing the configuration of an optical device 300 for augmented reality according to another embodiment of the present invention, in which FIG. 17 is a perspective view of the optical device 300 for augmented reality and FIG. 18 is a front view of the optical device 300 for augmented reality.

The optical device 300 for augmented reality of FIGS. 17 and 18 has the same basic configuration as the optical device 200 for augmented reality of the embodiment described with reference to FIGS. 4 to 6, and is characterized in that a plurality of second reflective means 301 to 305 each composed of a plurality of reflective units 31 to 37 are formed.

In this case, the plurality of second reflective means 301 to 305 have the following arrangement structure. In other words, as described above, when the optical means 10 is placed in front of a user's pupil 50, a forward direction from the pupil 50 is set as the x axis, and one of the line segments passing between the inner surfaces of the optical means 10 while being parallel to a vertical line from the image output unit 40 to the x axis along the x axis is set as the y axis, the z axis is a line segment passing between the inner surfaces of the optical means 10 while being orthogonal to the x axis and the y axis. In this case, the plurality of second reflective means 301 to 305 are arranged in parallel at intervals along an imaginary straight line parallel to the z axis.

In this case, each of the plurality of reflective units 31 to 37 constituting each of the plurality of second reflective means 301 to 305, together with any one of the plurality of reflective units 31 to 37 constituting the adjacent second reflective means 301 to 305, i.e., the second reflective means 301 to 305 on both sides thereof, may be arranged alongside each other along an imaginary straight line parallel to the z axis.

Accordingly, when the plurality of second reflective means 301 to 305 are viewed in the z-axis direction, they appear the same as in FIG. 4.

According to the embodiment of FIGS. 17 and 18, there is the advantage of widening a field of view and an eye box in the z-axis direction while having the same effects as described with reference to FIGS. 4 to 6.

Figure 19:
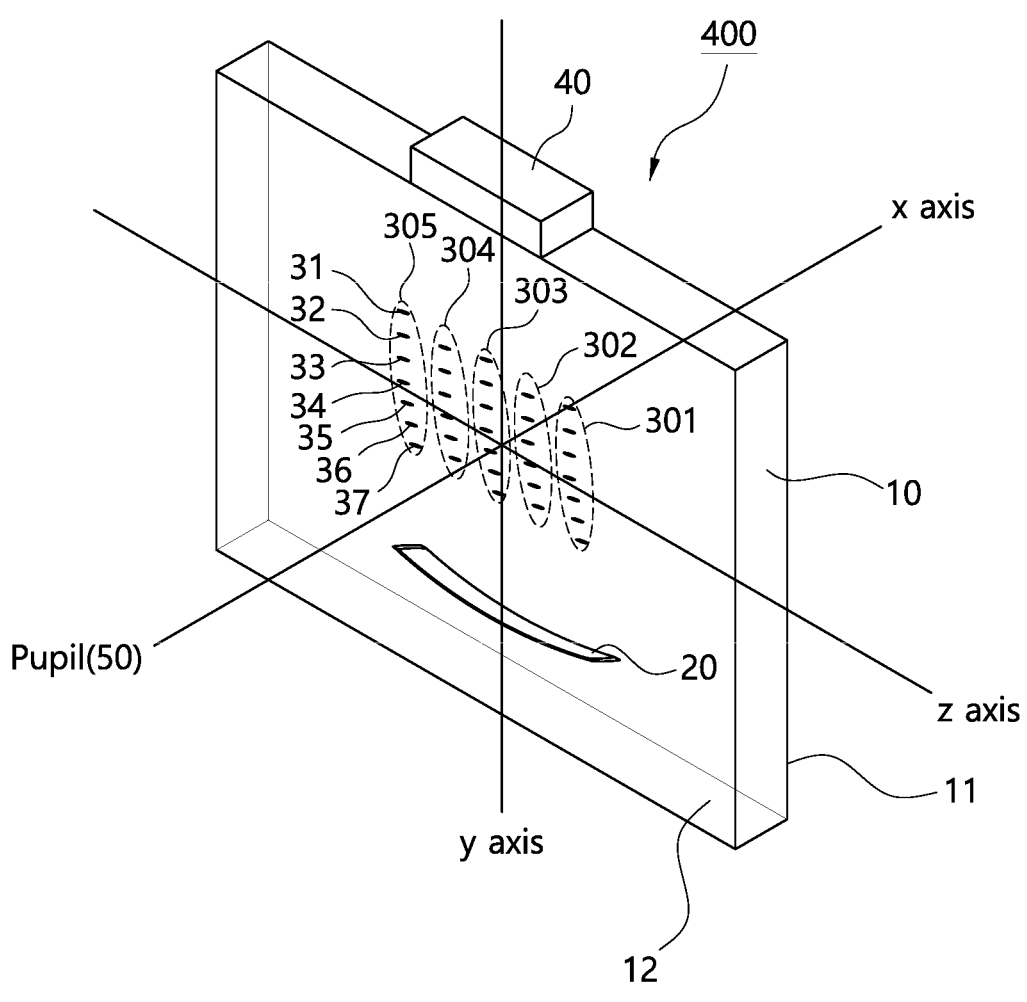
FIGS. 19 and 20 are a perspective view and front view of an optical device (400) for augmented reality according to still another embodiment of the present invention.
Figure 20:
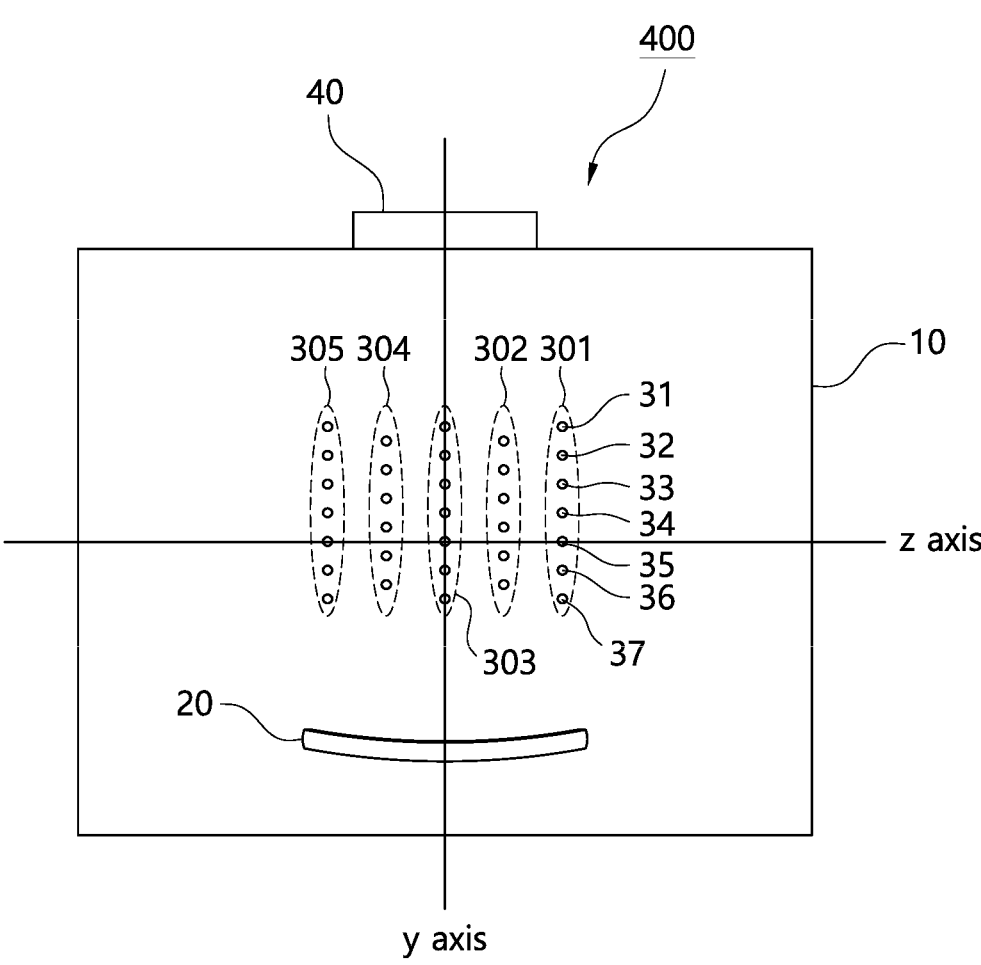

FIGS. 19 and 20 are diagrams showing the configuration of an optical device 400 for augmented reality according to still another embodiment of the present invention, in which FIG. 19 is a perspective view of the optical device 400 for augmented reality and FIG. 20 is a front view of the optical device 400 for augmented reality.

The optical device 400 for augmented reality of the embodiment of FIGS. 19 and 20 is basically the same as the optical device 300 for augmented reality of the embodiment described with reference to FIGS. 17 and 18. However, the optical device 400 for augmented reality is characterized in that at least some of the plurality of reflective units 31 to 37 constituting each of the plurality of second reflective means 301 to 305, together with the plurality of reflective units 31 constituting the adjacent second reflective means 301 to 305, are arranged not to be positioned alongside each other along an imaginary straight line parallel to the z axis.

In other words, as shown in FIGS. 19 and 20, when the reflective units 31 to 37 of the first second reflective means 301 and the reflective units 31 to 36 of the second second reflective means 302, which are adjacent to each other from the right side of the z axis, are compared with each other sequentially from the upper side of the y axis (the image output unit (40) side), each of the reflective units 31 to 37 of the first second reflective means 301 is arranged not to be located together with all the reflective units 31 to 36 of the second reflective means 302 along an imaginary straight line parallel to the z axis.

In other words, it can be seen that the reflective units 31 to 37 of the first second reflective means 301 and the reflective units 31 to 36 of the second second reflective means 302 are not arranged alongside each other along an imaginary straight line parallel to the z axis but are staggered from each other when viewed in the x-axis direction.

Figure 21:
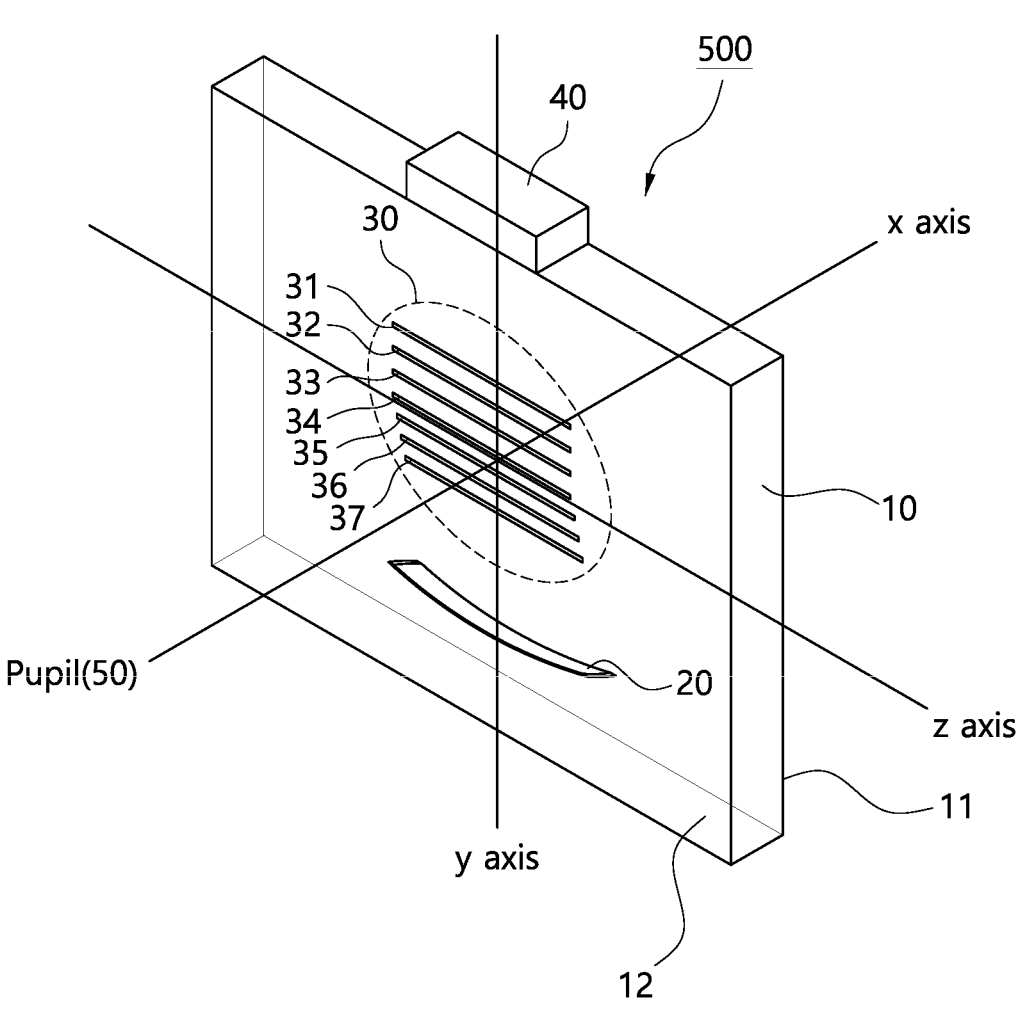
FIGS. 21 and 22 are a perspective view and front view of an optical device (500) for augmented reality according to still another embodiment of the present invention.
Figure 22:
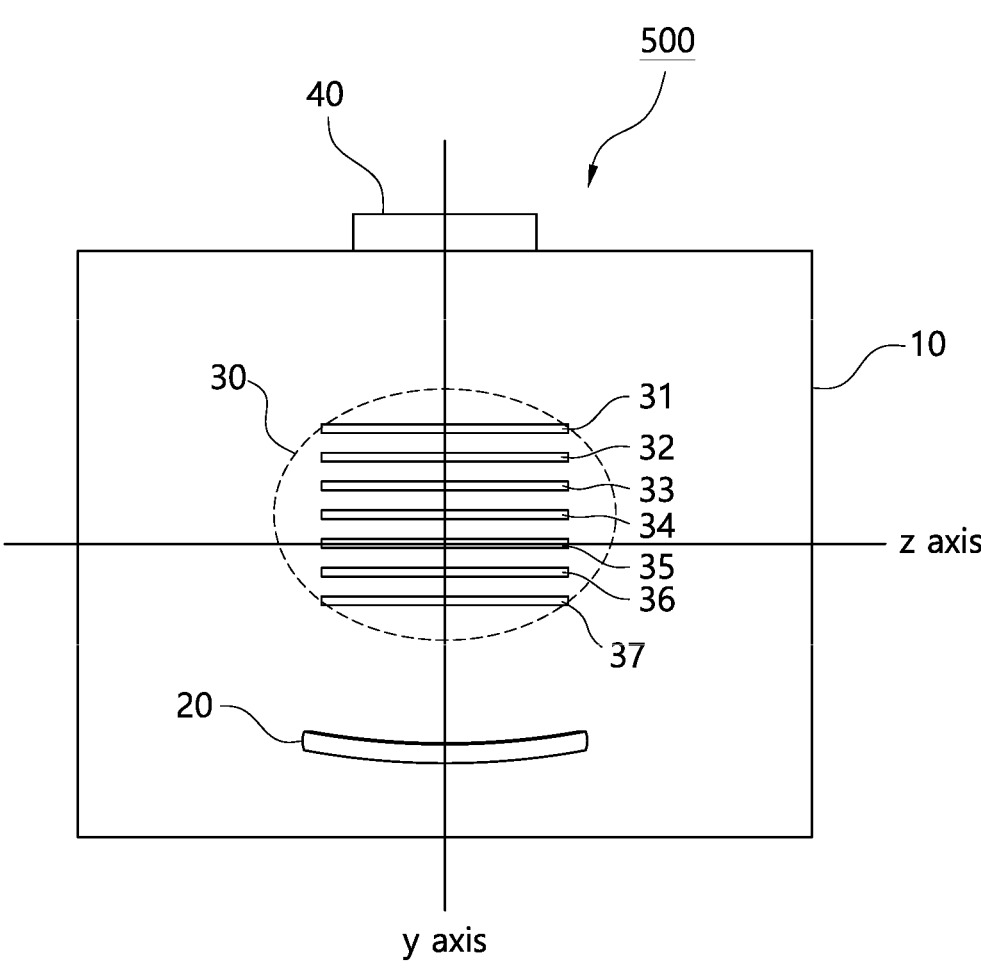

FIGS. 21 and 22 are diagrams showing the configuration of an optical device 500 for augmented reality according to still another embodiment of the present invention, in which FIG. 21 is a perspective view of the optical device 500 for augmented reality and FIG. 22 is a front view of the optical device 500 for augmented reality.

The optical device 500 for augmented reality of the embodiment of FIGS. 21 and 22 is basically the same as the embodiment described with reference to FIGS. 4 to 6, but is characterized in that each of the plurality of reflective units 31 to 37 is formed in a bar shape that extends along an imaginary straight line parallel to the z axis.

In this case, the plurality of individual reflective units 31 to 37 have the following arrangement structure. In other words, as described above, when the optical device 500 for augmented reality is placed in front of a user's pupil 50, a forward direction from the pupil 50 is set as the x axis, and any one of the line segments passing between the inner surfaces of the optical means 10 while being parallel to a vertical line extending from the image output unit 40 to the x axis along the x axis is set as the y axis, the z axis becomes a line segment passing between the inner surfaces of the optical means 10 while being orthogonal to the x axis and the y axis. In this case, the plurality of reflective units 31 to 37 are formed in bar shapes that extend along imaginary straight lines parallel to the z axis.

Even in the present embodiment, when the optical means 10 is viewed toward a plane perpendicular to the z axis, the plurality of reflective units 31 to 37 appear the same as those shown in FIG. 4.

Meanwhile, in the embodiments of FIGS. 4 to 22, when the optical means 10 is viewed from the pupil 50 in a forward direction, i.e., toward a plane perpendicular to the x axis, the first reflective means 20 is formed to extend closer to the second reflective means 301 to 305 in the directions from the central portion thereof toward both left and right ends thereof, and is formed in a moderate "U" bar shape as a whole. This is intended to allow the first reflective means 20 to perform a function as a collimator more desirably.

The overall length of the first reflective means 20 in the z-axis direction is formed to extend to correspond to the total length of the plurality of second reflective means 301 to 305 in the z-axis direction.

Even in this case, as described above, it is preferable that the length of the first reflective means 20 in the widthwise direction be 4 mm or less.

In addition, other features of the first reflective means 20 described with reference to FIGS. 4 to 6 above may also be applied to the embodiments of FIGS. 17 to 22 without change.

Figure 23:
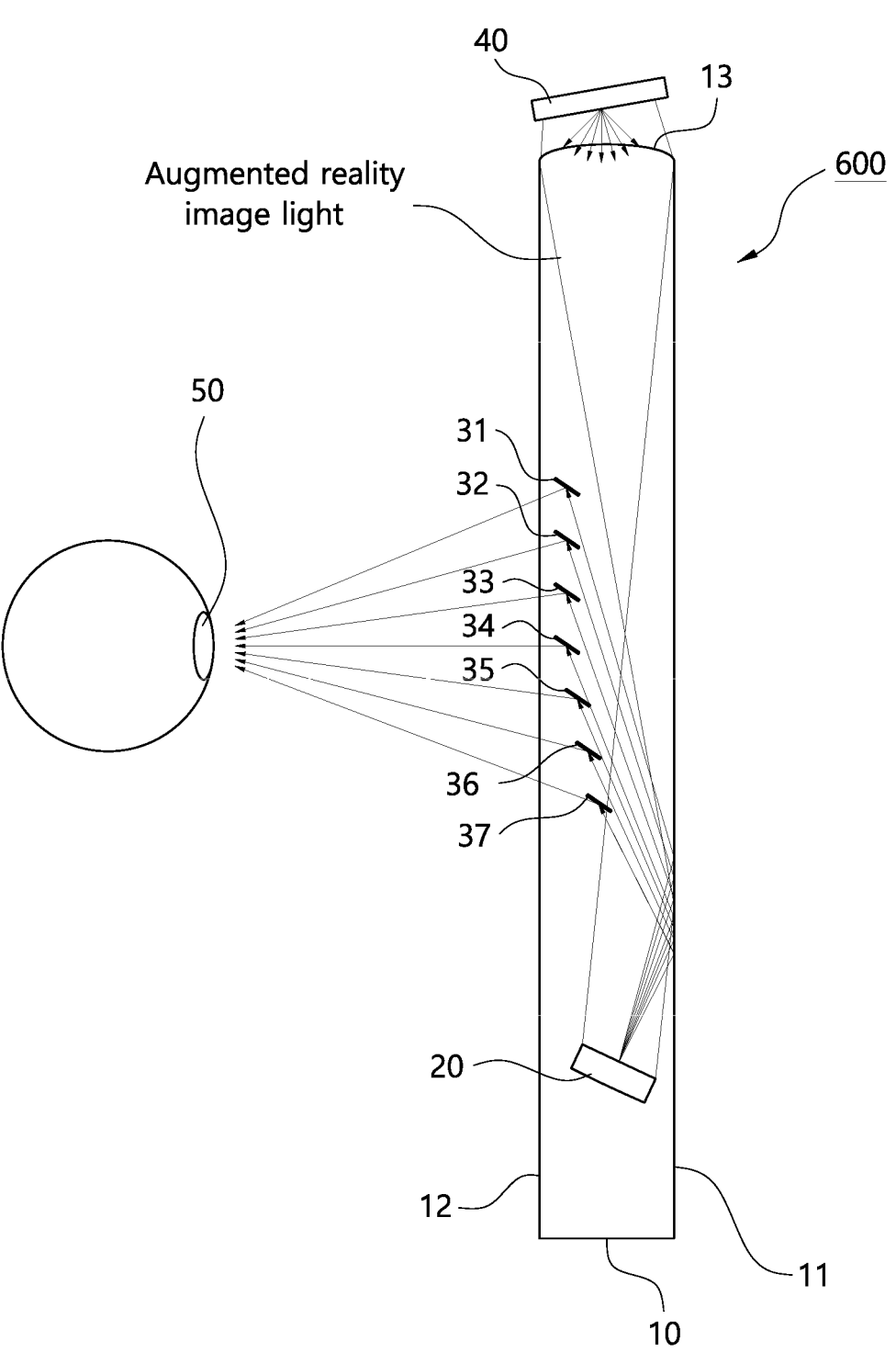
FIG. 23 shows an optical device (600) for augmented reality according to still another embodiment of the present invention, and is a side view of the optical device (600) for augmented reality that is viewed toward a plane perpendicular to the z axis.

FIG. 23 shows an optical device 600 for augmented reality according to still another embodiment of the present invention, and is a side view of the optical device 600 for augmented reality that is viewed toward a plane perpendicular to the z axis.

The embodiment of FIG. 23 is basically the same as the embodiment of FIGS. 4 to 6, but is characterized in that a third surface 13 through which the augmented reality image light output from the image output unit 40 is incident on the optical means 10 is formed as a curved surface to have refractive power.

The third surface 13 is formed as a curved surface protruding toward the image output unit 40, and may function as a collimator for augmented reality image light incident from the image output unit 40. Accordingly, the third surface 13 may be used as an auxiliary collimator together with the first reflective means 20 that functions as a collimator, and thus overall performance as a collimator may be improved.

Although the third surface 13 is shown as being formed between the first and second surfaces 11 and 12 in FIG. 23, the present embodiment is not limited thereto. It should be noted that the third surface 13 refers to a surface through which the augmented reality image light output from the image output unit 40 is incident onto the optical means 40.

Figure 24:
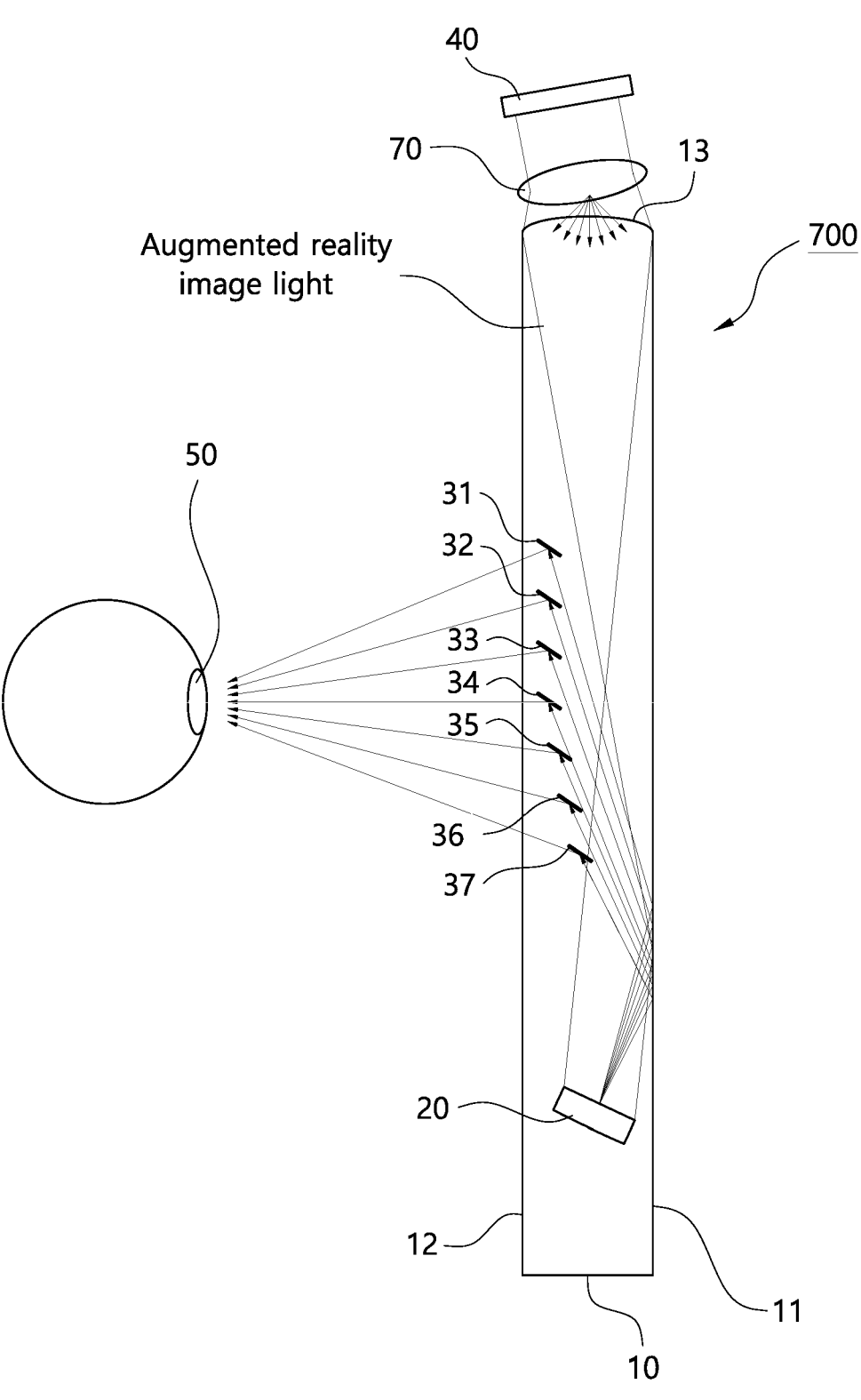
FIG. 24 shows an optical device (700) for augmented reality according to still another embodiment of the present invention, and is a side view of the optical device (700) for augmented reality that is viewed toward a plane perpendicular to the z axis.

FIG. 24 shows an optical device 700 for augmented reality according to still another embodiment of the present invention, and is a side view of the optical device 700 for augmented reality that is viewed toward a plane perpendicular to the z axis.

The embodiment of FIG. 24 is basically the same as the embodiment of FIG. 23, but is characterized in that an auxiliary optical means 70 is further disposed between the image output unit 40 and the third surface 13.

In FIG. 24, the auxiliary optical means 70 is formed of a convex lens, but this is illustrative. A combination of one or more of other various reflective means, refractive means, and diffractive means may be used. The overall performance of the optical device 700 for augmented reality may be improved by appropriately utilizing the auxiliary optical means 70.

Figure 25:
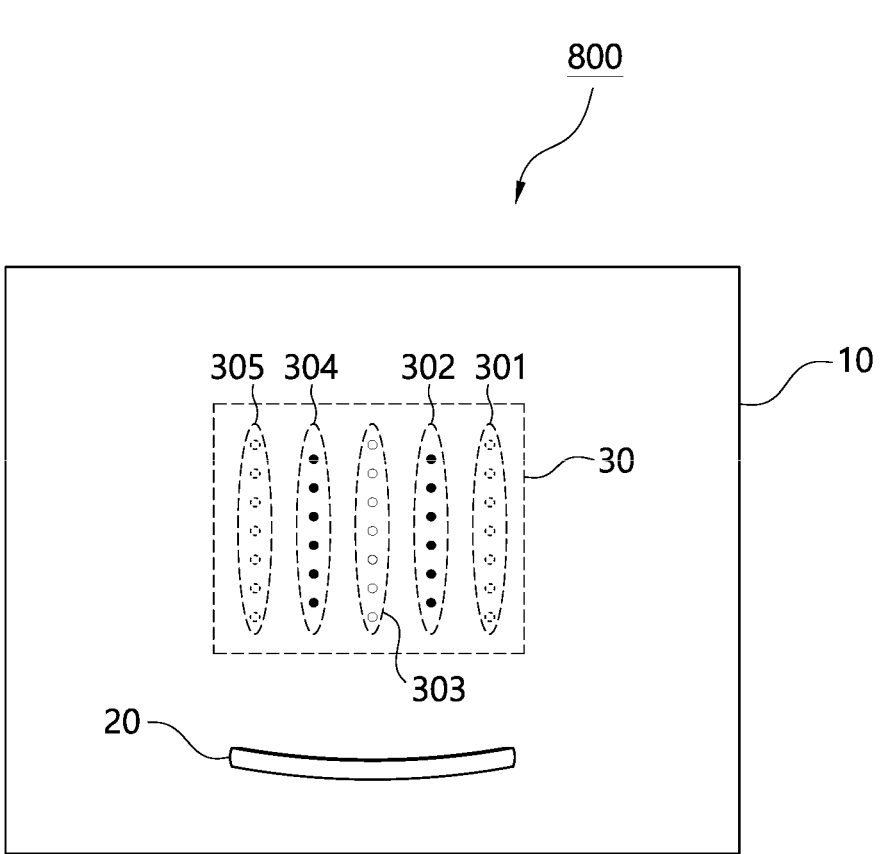
FIGS. 25 to 27 are a front view, side view, and plan view of a compact optical device (800) for augmented reality according to still another embodiment of the present invention.
Figure 26:
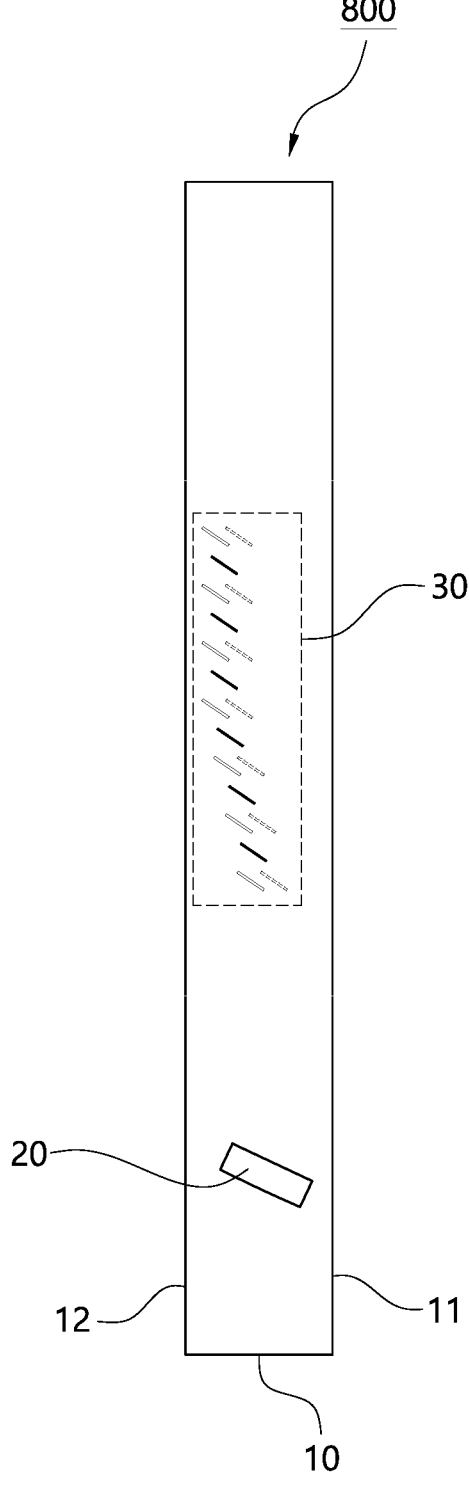

FIGS. 25 to 27 are diagrams illustrating an optical device 800 for augmented reality according to still another embodiment of the present invention, in which FIG. 25 is a front view of the optical device 800 for augmented reality that is viewed from the pupil (50) side, FIG. 26 is a side view of the optical device 800 for augmented reality that is viewed toward a plane perpendicular to the z axis as described above, and FIG. 27 is a plan view of the optical device 800 for augmented reality that is viewed toward a plane perpendicular to the y axis as described above.

Figure 27:
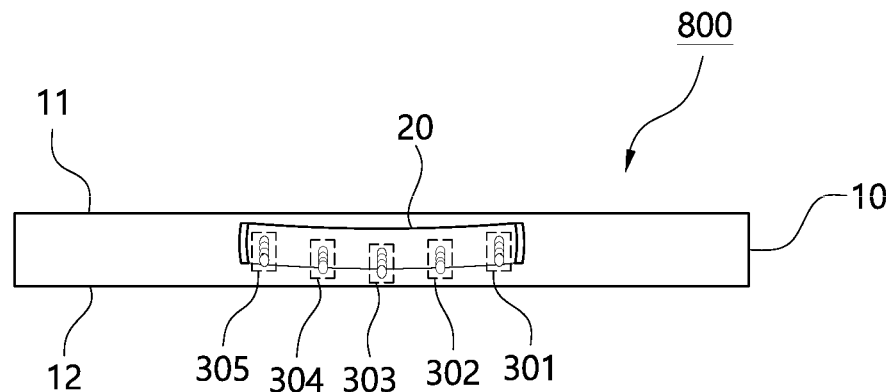

The optical device 800 for augmented reality shown in FIGS. 25 to 27 has the same basic configuration as the optical device 300 for augmented reality of FIG. 18, but is different in that there are one or more second reflective means 301 to 305 disposed such that the distances between the plurality of second reflective means 301 to 305 and the second surface 12 of the optical means 10 are not all the same.

In other words, as described above, when the optical device 800 for augmented reality is placed in front of the user's pupil 50, a forward direction from the pupil 50 is set as the x axis, any one of the line segments passing between the inner surfaces of the optical means 10 while being parallel to a vertical line extending from the image output unit 40 to the x axis along the x axis is set as the y axis, and a line segment passing between the inner surfaces of the optical means 10 while being orthogonal to the x axis and the y axis is set as the z axis, the reflective means 301 to 305 are arranged such that there are one or more reflective means 301 to 305 arranged such that the distances between the individual reflective means 301 to 305 and the second surface 12 of the optical means 10 are not all the same.

In other words, as shown in FIG. 26, this means that, when the optical device 800 for augmented reality is viewed toward a plane perpendicular to the z axis, there are one or more second reflective means 301 to 305 arranged such that at least some of the plurality of second reflective means 301 appear non-overlapping.

In the embodiment of FIGS. 25 to 27, an arrangement is made such that the distance between the two second reflective means 301 and 305 indicated by dotted lines and the second surface 12 of the optical means 10, the distance between the two second reflective means 302 and 304 indicated in black and the second surface 12 of the optical means 10, and the distance between one second reflective means 303 indicated in white and the first surface 12 of the optical means 10 are different from each other.

In this case, although the distances between the two second reflective means 301 and 305 indicated by dotted lines and the second surface 12 of the optical means 10 are shown as being the same and the distances between the two second reflective means 302 and 304 indicated in black and the second surface 12 of the optical means 10 are shown as being the same, this is illustrative. It is obvious that an arrangement may be made such that all the distances between the second reflective means 301 to 305 and the second surface 12 of the optical means 10 are different from each other.

Meanwhile, in the above-described embodiments, all the sizes of the plurality of reflective units 31 to 37 do not necessarily need to be the same, but the size of at least some reflective units may be configured to be different from that of the other reflective units 31 to 37. Even in this case, it is preferable that the reflective units 31 to 37 be formed to have a size of 4 mm or less as described above.

Alternatively, although it is preferable that the plurality of reflective units 31 to 37 be arranged at the same intervals, the plurality of reflective units 31 to 37 may be arranged such that the intervals between at least some of the reflective units 31 to 37 may be different from the intervals between the other reflective units 31 to 37.

Furthermore, the angle of inclination of at least some of the reflective units 31 to 37 with respect to the x axis may be configured to be different from that of the other reflective units 31 to 37.

Furthermore, at least some of the plurality of reflective units 31 to 37 may each be formed of a means such as a half mirror that partially reflects light.

Furthermore, at least some of the plurality of reflective units 31 to 37 may each be formed of a refractive element other than a reflective means.

Furthermore, at least some of the plurality of reflective units 31 to 37 may each be formed of an optical element such as a notch filter that selectively transmits light therethrough depending on the wavelength thereof.

Furthermore, at least some of the plurality of reflective units 31 to 37 may each be coated with a material absorbing light without reflecting light on the surface of the reflective unit opposite to the surface of the reflective unit that reflects augmented reality image light.

Furthermore, the surfaces of at least some of the plurality of reflective units 31 to 37 may each be formed as a curved surface. In this case, the curved surface may be a concave surface or a convex surface.

Furthermore, at least some of the reflective units 31 to 37 may each be formed of an optical element such as a diffractive optical element (DOE) or a holographic optical element (HOE).

Next, a method for manufacturing the optical means 10 of the optical devices 200 to 800 for augmented reality described in the above-described embodiments will be described with reference to FIGS. 28 to 32.

Figure 28:
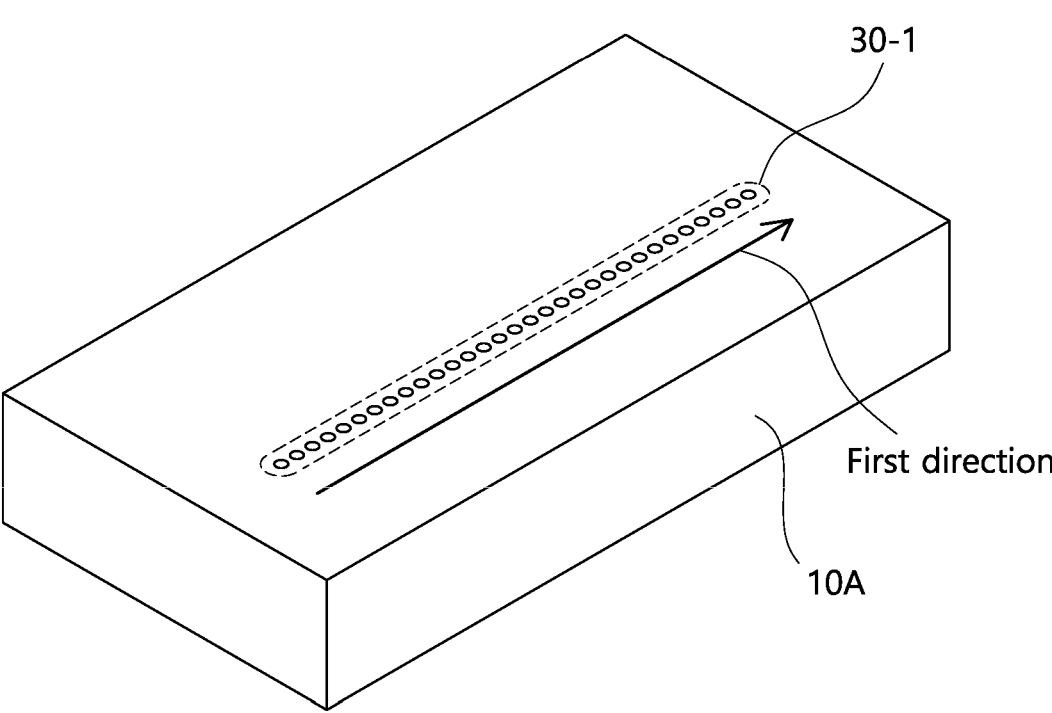
FIG. 28 is a perspective view of a lower base substrate (10A)
Figure 29:
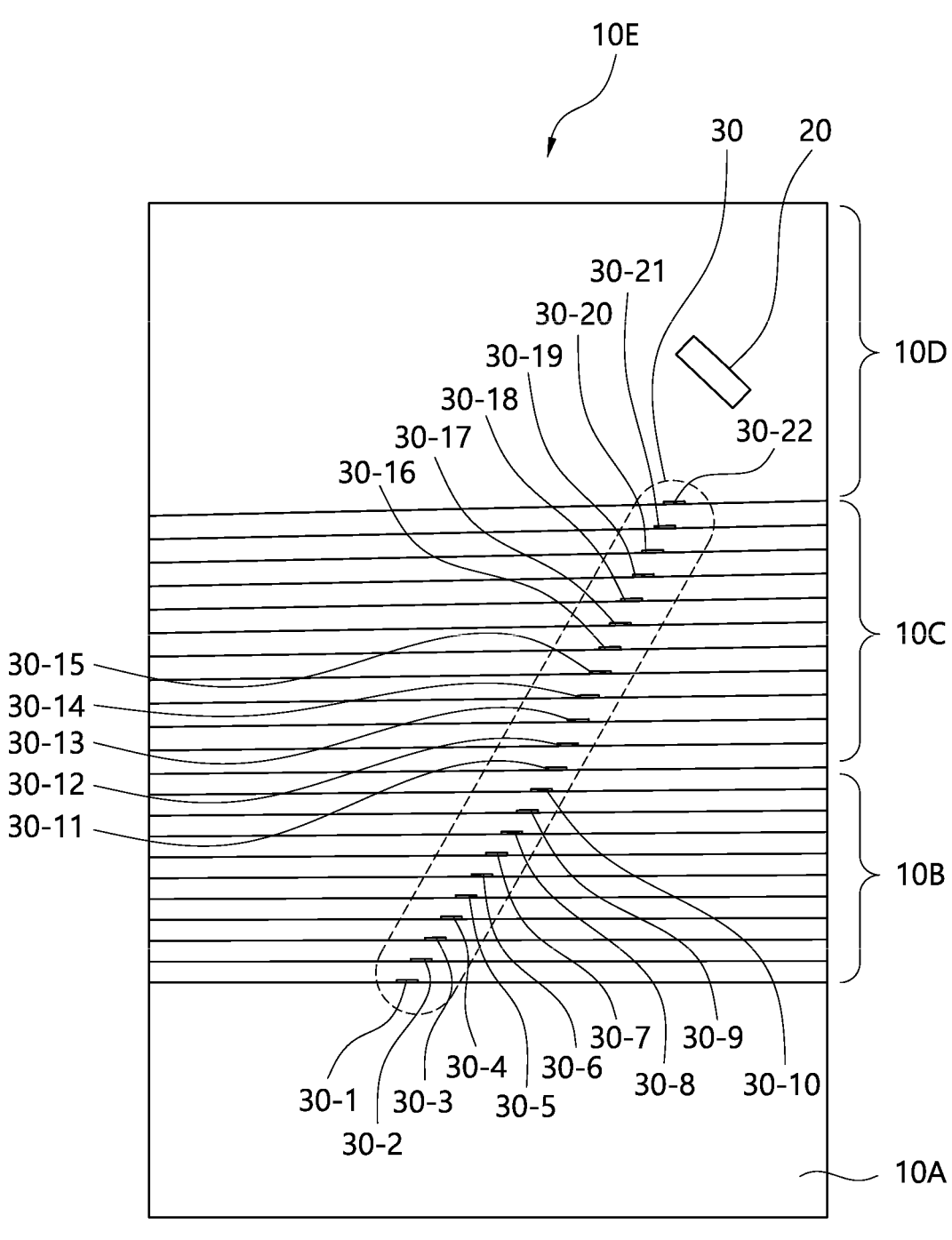
FIG. 29 is a side view of an optical means base material (10E)
Figure 30:
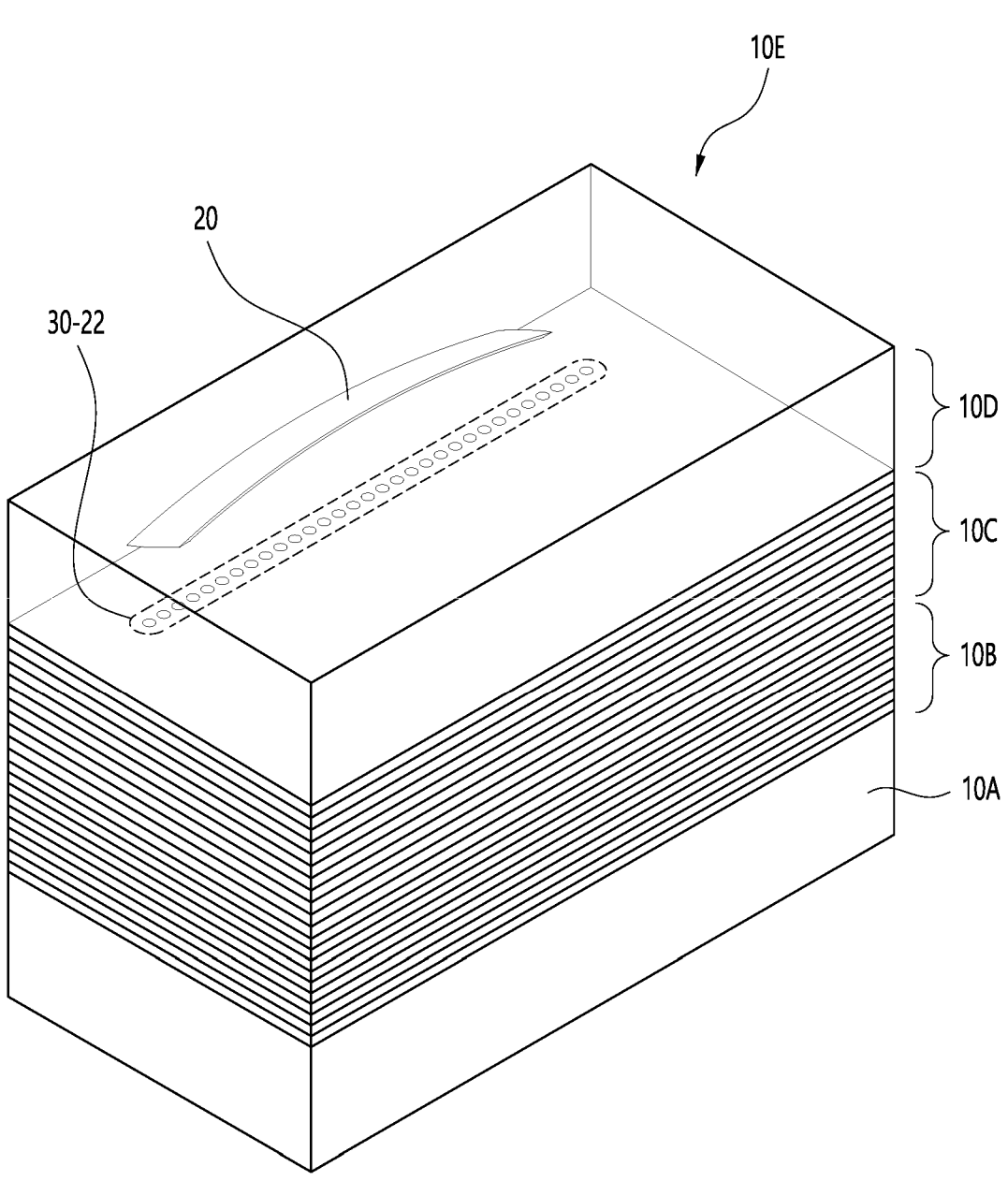
FIG. 30 is a perspective view of the optical means base material (10E)
Figure 31:
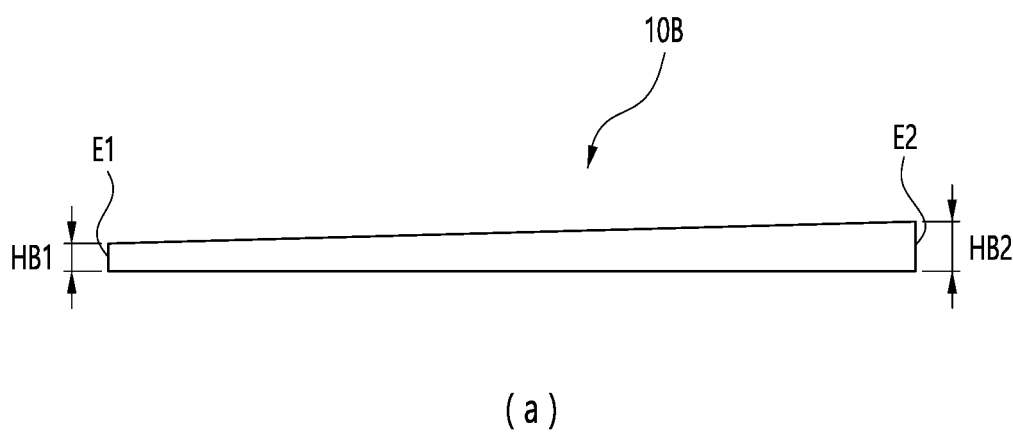
FIG. 31 shows side views of a first substrate (10B) and a second substrate (10C)
Figure 31:
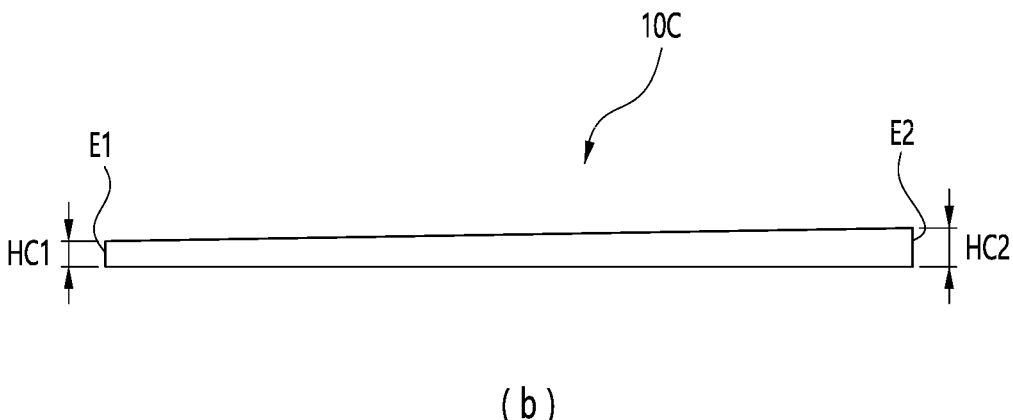
Figure 32:
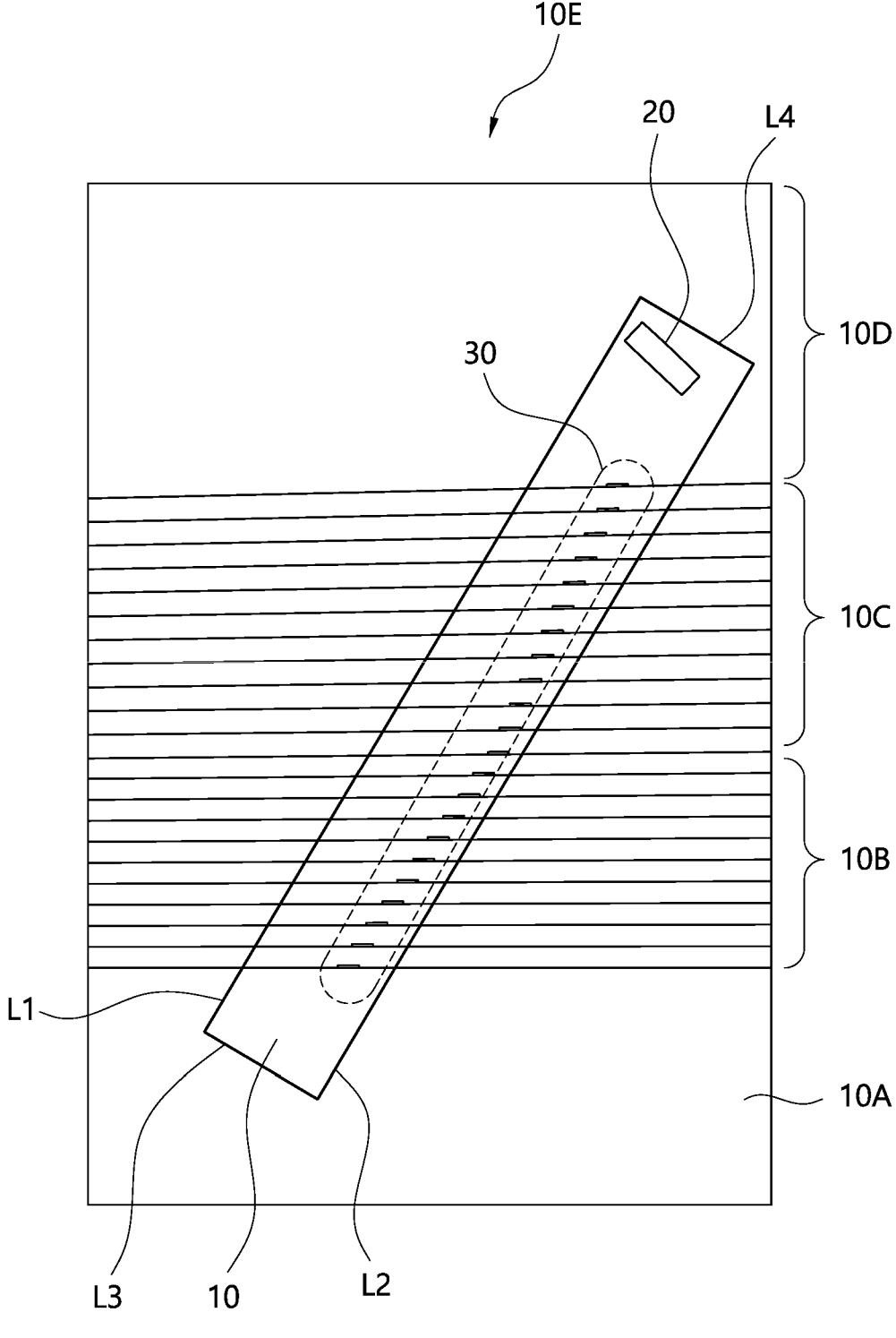
FIG. 32 is a diagram illustrating a method of forming an optical means (10) by cutting the optical means base material (10E)

FIG. 28 is a perspective view of a lower base substrate 10A, FIG. 29 is a side view of an optical means base material 10E, FIG. 30 is a perspective view of the optical means base material 10E, FIG. 31 shows side views of a first substrate 10B and a second substrate 10C, and FIG. 32 is a diagram illustrating a method of forming the optical means 10 by cutting the optical means base material 10E.

The optical means 10 of the optical devices 200 to 800 for augmented reality described in the above-described embodiments are manufactured through the process of first forming the optical means base material 10E by stacking the lower base substrate 10A, first substrates 10B, second substrates 10C, and an upper base substrate 10D one on top of one another and then cutting the optical means base material 10E.

To this end, first, as shown in FIG. 28, a plurality of reflective units 30-1 are formed on the surface of the lower base substrate 10A in a first direction.

In this case, although the lower base substrate 10A has an approximately rectangular parallelepiped shape, it is not limited thereto.

Furthermore, as shown in FIGS. 29 and 30, a plurality of reflective units 30-2 to 30-11 are formed on the surfaces of the plurality of first substrates 10B along directions parallel to the first direction, and a plurality of reflective units 30-12 to 30-22 are also formed on the surfaces of the second substrates 10C along directions parallel to the first direction.

In addition, as shown in FIGS. 29 and 30, the second reflective means 30 is formed by sequentially bonding and stacking the plurality of first substrates 10B on the surface of the lower base substrate 10A and then sequentially bonding and stacking the plurality of second substrates 10C on the uppermost one of the stacked first substrates 10B.

In this case, the reflective units 30-2 to 30-11 formed on each of the plurality of first substrates 10B are formed on a surface of each of the first substrates 10B so that a line connecting the centers of the foremost reflective units 30-1 to 30-11, which are viewed when the first substrates 10B are viewed from the outside toward a plane perpendicular to the first direction, i.e., when the first substrates 10B are viewed in the direction of the paper in FIG. 29, forms a straight line.

In addition, the reflective units 30-12 to 30-22 formed on each of the plurality of second substrates 10C are formed on a surface of each of the second substrates 10C so that a line connecting the centers of the foremost reflective units 30-12 to 30-22, which are viewed when the second substrates 10C are viewed from the outside toward a plane perpendicular to the first direction, i.e., when the second substrates 10C are viewed in the direction of the paper in FIG. 24, forms a straight line.

In this case, the reflective units 30-12 to 30-22 are arranged such that a straight line connecting the centers of the reflective units 30-1 to 30-11 and a straight line connecting the centers of the reflective units 30-12 to 30-22 are not parallel to each other.

Through this process, the second reflective means 30 is constructed by the reflective units 30-1 to 30-22.

Meanwhile, the plurality of first substrates 10B have the same shape, and the plurality of second substrates 10C also have the same shape.

Furthermore, the plurality of first substrates 10B and the plurality of second substrates 10C have different shapes.

Furthermore, as shown in FIG. 31(*a*), the first substrates 10B are formed such that the height HB2 of any one E2 of both ends E1 and E2 of each of the first substrates 10B is higher than the height HB1 of the other end E1 when the first substrates 10B are viewed toward a plane perpendicular to the first direction.

In addition, as shown in FIG. 31(*b*), the second substrates 10C are formed such that the height HC2 of any one E2 of both ends E1 and E2 of each of the second substrates 10C is higher than the height HC1 of the other end E1 when the second substrates 10C are viewed toward a plane perpendicular to the first direction.

In this case, since the first substrates 10B and the second substrates 10C have different shapes, HB1≠HC1 and HB2≠HC2. Alternatively, HB1≠HC1 and HB2=HC2, or HB1=HC1 and HB2≠HC2.

Meanwhile, the reflective units 30-1 to 30-22 may be formed on the lower base substrate 10A, the first substrates 10B, and the second substrates 10C using, for example, a mask deposition method or an adhesive bonding method. Since this is known in the prior art and is not a direct target of the present invention, a detailed description thereof will be omitted.

As described above, when the stacking of the second substrates 10C is completed, the upper base substrate 10D including the first reflective means 20 is bonded and stacked on the uppermost one of the stacked second substrates 10C, thereby forming the optical means base material 10E as shown in FIGS. 29 and 30.

In this case, as shown in FIGS. 29, 30 and 32, the first reflective means 20 is disposed inside the upper base substrate 10D. As in the above-described embodiment, the first reflective means 20 is disposed at an appropriate position inside the upper base substrate 10D by taking into consideration the position of the image output unit 40, the position of the first reflective means 30, and the position of the pupil 50.

Meanwhile, the adhesion between the individual substrates of the lower base substrate 10A, the first substrates 10B, the second substrates 10C, and the upper base substrate 10D is performed by, for example, a method of applying an adhesive between the substrates and tightly fixing both substrates together. Since this is also known in the prior art and is not a direct target of the present invention, a detailed description thereof will be omitted.

Furthermore, the lower base substrate 10A, the first substrates 10B, the second substrates 10C, and the upper base substrate 10D are preferably made of a glass or plastic material having the same refractive index.

Once the optical means base material 10E has been formed through the above process, it is cut to form the optical means 10.

In other words, as shown in FIG. 32, the optical means base material 10E is cut in directions parallel to the first direction along two parallel straight lines L1 and L2 that allow the reflective units 31 to 37 to be all included therebetween when the optical means base material 10E is viewed toward a plane perpendicular to the first direction in which the plurality of reflective units 31 to 37 constituting the second reflective means 30 are arranged.

In this case, the surface cut in the direction parallel to the first direction along a straight line L1 becomes the first surface 11 of the optical means 10 described above, and the surface cut in the direction parallel to the first direction along a straight line L2 becomes the second surface 12 of the optical means 10 described above.

When the optical means 10 is disposed such that the pupil 50 is located in the normal direction perpendicular to the two straight lines L1 and L2, the optical device 200 for augmented reality in the form of FIG. 4 is obtained as an example. Accordingly, an angle of inclination that each of the reflective units 31 to 37 has with respect to a forward direction from the pupil 50 (the x-axis direction in FIG. 4) may be defined by the boundary surfaces of the individual substrates 10A, 10B, and 10C.

Then, the optical means base material 10E is cut again in directions parallel to the first direction along two straight lines L3 and L4 to finally form the optical means 10. In this case, the surfaces cut in the directions parallel to the first direction along the two straight lines L3 and L4 become surfaces corresponding to the top and bottom surfaces of the optical means 10 when the optical means 10 is placed in front of the pupil 50.

According to this manufacturing method, the optical means 10 may be fabricated using the plurality of first substrates 10B having the same shape and the plurality of second substrates 10C having the same shape. Accordingly, the manufacturing process is simple compared to the conventional manufacturing method described above, and thus there is the advantage of significantly reducing the defect rate.

Meanwhile, although the substrates 10A, 10B, and 10C have been described as being bonded after the reflective units 30-1 to 30-22 have been formed on the lower base substrate 10A, the plurality of first substrates 10B, and the plurality of second substrates 10C in the embodiments of FIGS. 28 to 32, this is illustrative.

For example, there may be employed a method of, after forming the reflective units 30-1 on the lower base substrate 10A, sequentially bonding and stacking the first substrates 10B while forming the reflective units 30-2 to 30-11 on each of the plurality of first substrates 10B. The same also applies to the case of the second substrate 10C.

Next, an optical device 900 for augmented reality according to still another embodiment of the present invention will be described with reference to FIGS. 33 to 35.

Figure 33:
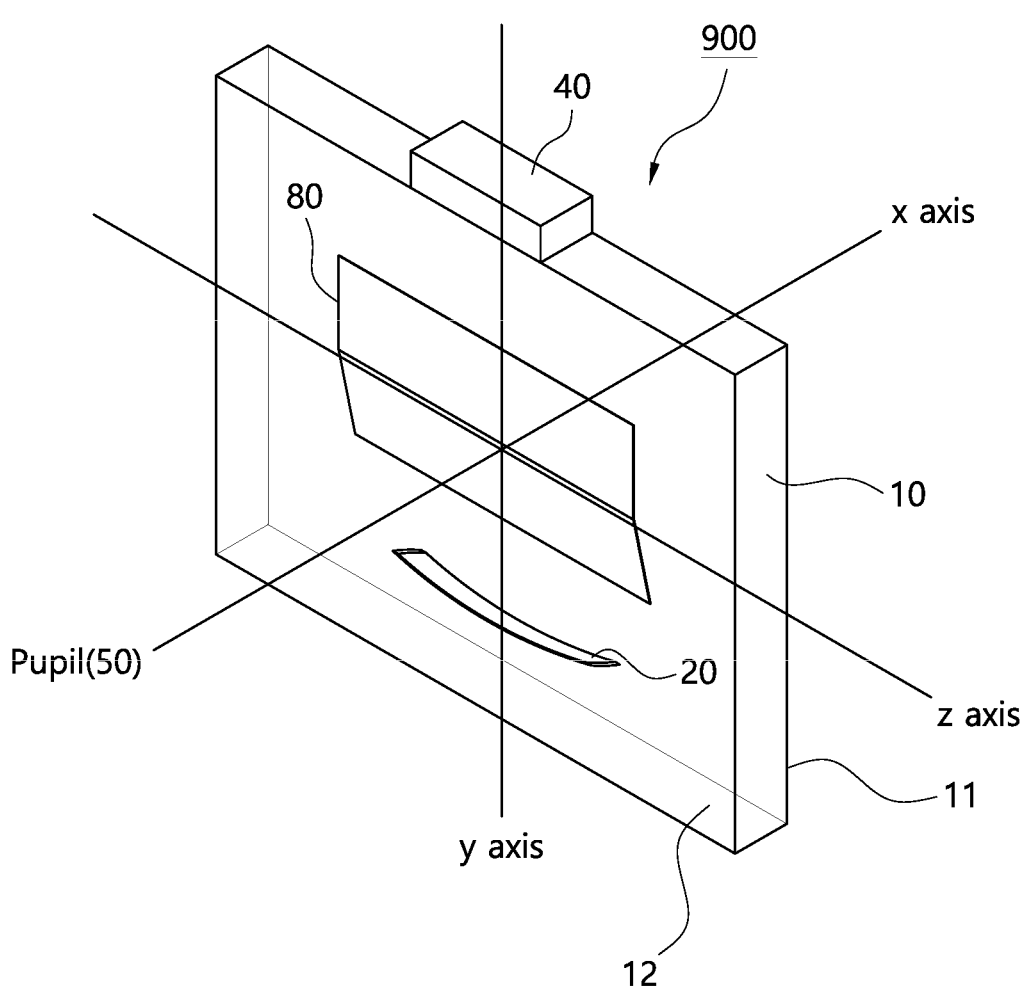
FIGS. 33 to 35 are a perspective view, front view, and side view of an optical device (900) for augmented reality having a straightly-arranged reflective structure according to still another embodiment of the present invention.
Figure 34:
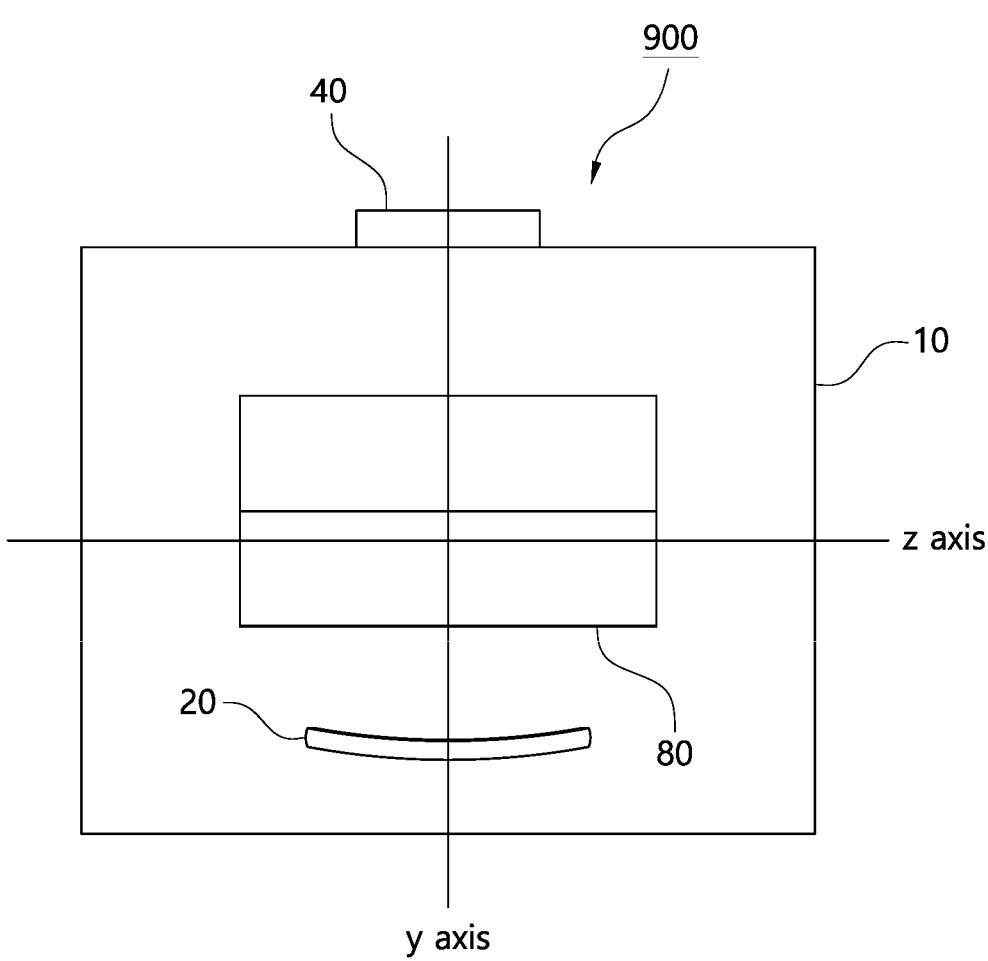
Figure 35:
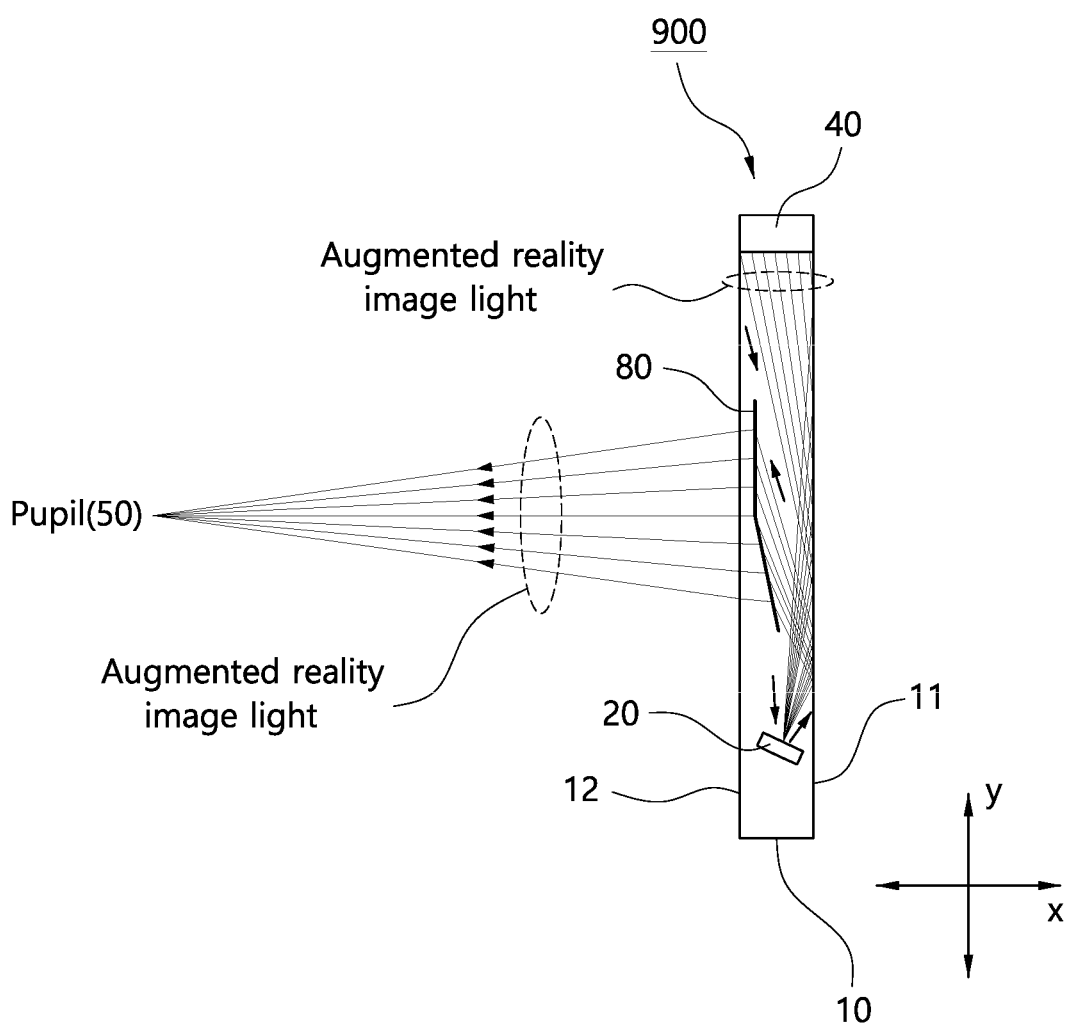

FIGS. 33 to 35 are diagrams showing the optical device 900 for augmented reality having a straightly-arranged reflective structure according to still another embodiment of the present invention, in which FIG. 33 is a perspective view when the optical device 900 for augmented reality is placed in front of the pupil 50, FIG. 34 is a front view when the optical device 900 for augmented reality is placed in front of the pupil 50, and FIG. 35 is a side view when the optical device 900 for augmented reality is placed in front of the pupil 50.

The optical device 900 for augmented reality according to the embodiments of FIGS. 33 to 35 is basically the same as the optical devices 200 to 800 for augmented reality of the embodiments described above, but there is a difference in that an optical element 80 formed of a single surface is used instead of the plurality of reflective units 31 to 37.

In the embodiment of FIGS. 33 to 35, the optical element 80 is embedded and disposed in the optical means 10 to transfer the augmented reality image light, transferred from the first reflective means 20, toward the pupil 50 of a user's eye, thereby providing an image for augmented reality to the user.

In FIG. 35, the arrows indicate the optical paths of augmented reality image light. As shown in the drawing, the augmented reality image light output from the image output unit 40 is reflected by total internal reflection on the first surface 11 of the optical means 10 and transferred to the first reflective means 20, and the augmented reality image light reflected by the first reflective means 20 is reflected by total internal reflection on the first surface 11 of the optical means 10 again and then transferred to the optical element 80, and is transferred to the pupil 50 through the optical element 80.

The optical element 80 has a shape corresponding to an imaginary plane on which the plurality of reflective units 31 to 37 constituting the plurality of second reflective means 301 to 305 are arranged in the optical devices 300 and 400 for augmented reality described with reference to FIGS. 17 to 20 above. The optical element 80 is formed of a diffractive optical element (DOE) or a holographic optical element (HOE).

As shown in FIGS. 33 to 35, the optical element 80 is formed in a single plane shape, and the single plane-shaped optical element is disposed inside the optical means 10 so that at least two straight lines that are not parallel to each other appear bent in a connected form when the optical means 10 is viewed toward a plane perpendicular to the z axis.

Since the DOE or the HOE has the property of transmitting and reflecting real object image light, the optical element 80 may transfer augmented reality image light to the pupil 50, and simultaneously, may transfer real object image light to the pupil 50 by transmitting the real object image light therethrough. However, optical efficiency for real object image light may be somewhat lowered.

In the case where the optical element 80 is used, there are advantages in that it may provide a more uniform augmented reality image than the second reflective means 30 of the above-described embodiments discontinuously arranged at regular intervals and the manufacturing process is significantly simplified because it may be fabricated using only two substrates formed by lines extending along the planar structure of the optical element 80.

Figure 36:
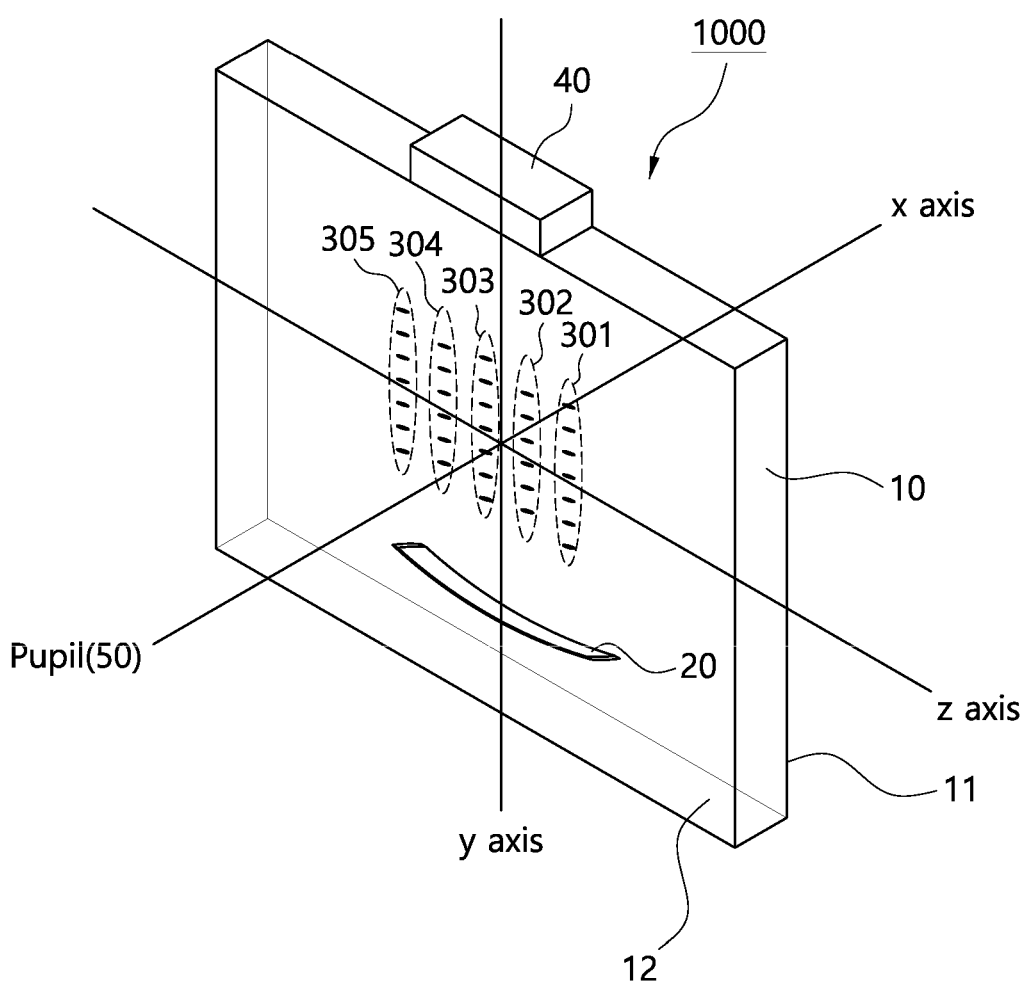
FIGS. 36 to 38 are a perspective view, side view, and front view of an optical device (1000) for augmented reality according to still another embodiment of the present invention.
Figure 37:
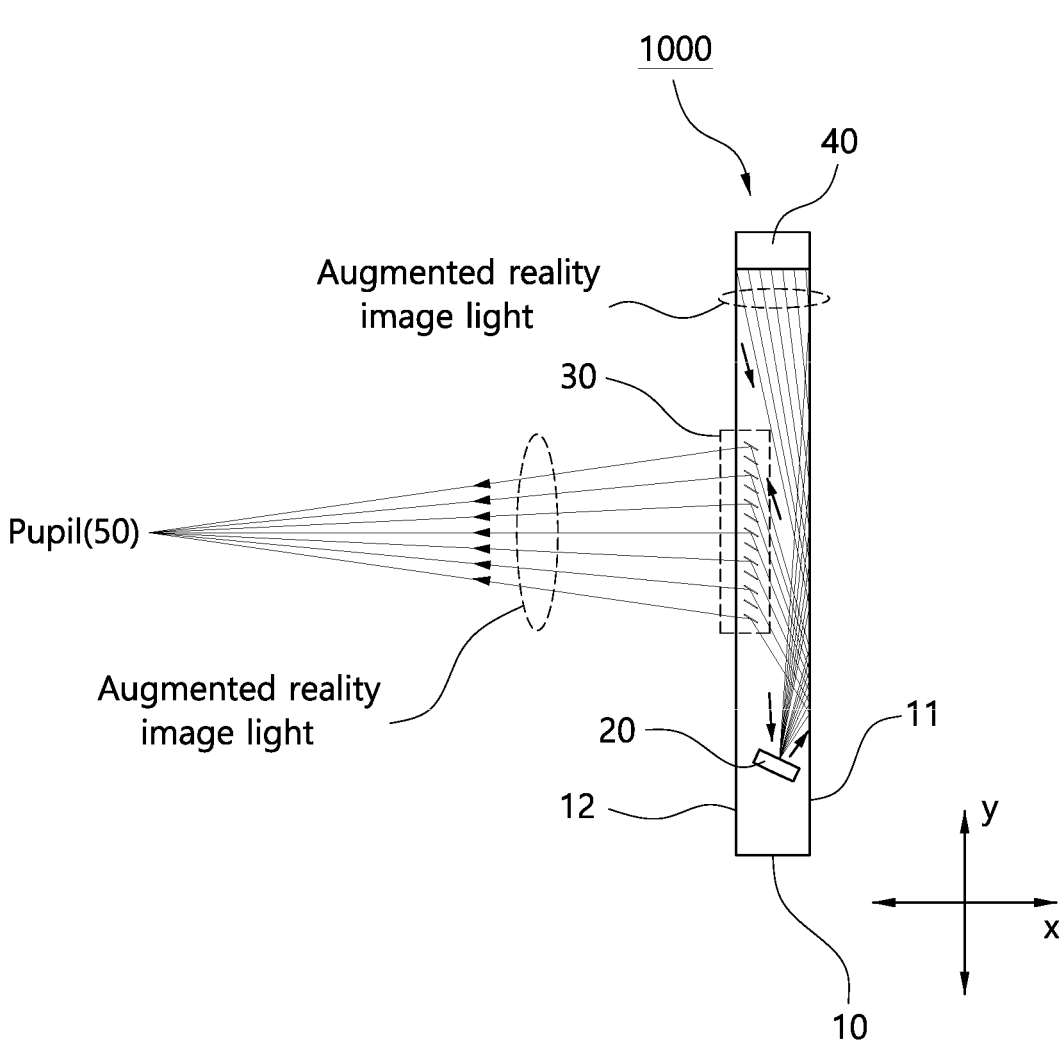
Figure 38:
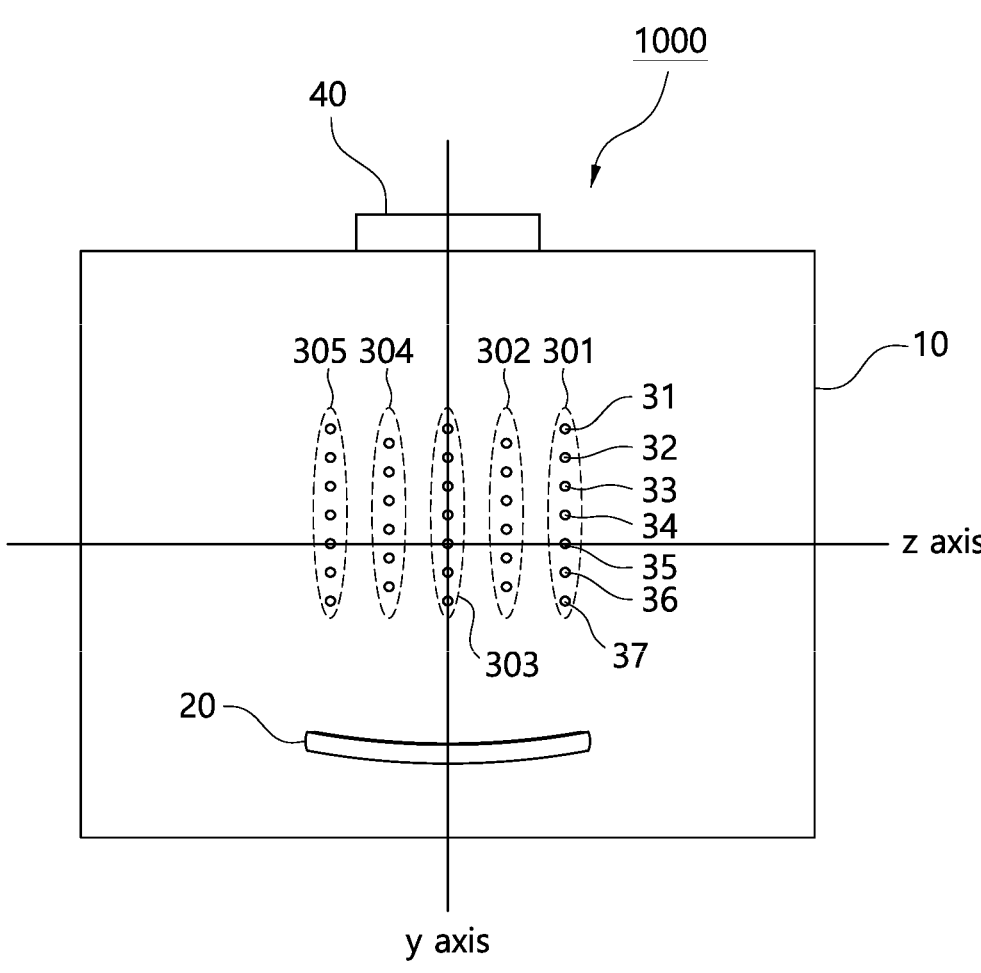

FIGS. 36 to 38 are diagrams illustrating an optical device 1000 for augmented reality according to still another embodiment of the present invention, in which FIG. 36 is a perspective view when the optical device 1000 for augmented reality is placed in front of the pupil 50, FIG. 37 is a side view when the optical device 1000 for augmented reality is placed in front of the pupil 50, and FIG. 38 is a front view when the optical device 1000 for augmented reality is viewed from the front of the pupil 50.

The optical device 1000 for augmented reality according to the embodiment of FIGS. 36 to 38 is basically the same as the optical devices 300 and 400 for augmented reality of the embodiments described with reference to FIGS. 17 to 20, but there is a difference in that a plurality of second reflective means 301 to 305 are arranged inside an optical means 10 such that the centers of a plurality of reflective units 31 to 37 constituting each of the plurality of second reflective means 301 to 305 are positioned on one single straight line.

In other words, in the optical device 1000 for augmented reality according to the embodiment of FIGS. 36 to 38, when the optical means 10 is placed in front of a user's pupil 50, a forward direction from the pupil 50 is set as the x axis, any one of the line segments passing between the first and second surfaces 11 and 12 of the optical means 10 while being parallel to a vertical line from the image output unit 40 to the x axis along the x axis is set as the y axis, and a line segment orthogonal to the x axis and the y axis is set as the z axis, all the plurality of reflective units 31 to 37 constituting each of the second reflective means 301 to 305 are arranged inside the optical means 10 so that the centers of the plurality of reflective units 31 to 37 are positioned on a single straight line when the optical means 10 is viewed from the outside toward a plane perpendicular to the z axis.

Although the plurality of second reflective means 301 to 305 are shown as being formed in FIGS. 36 to 38, only one second reflective means may be formed as shown in FIGS. 4 to 6.

In FIG. 37, the arrows indicate the optical paths of augmented reality image light. As described in FIG. 35, it can be seen that the augmented reality image light output from the image output unit 40 is reflected by total internal reflection on the first surface 11 of the optical means 10 and transferred to the first reflective means 20, and the augmented reality image light reflected by the first reflective means 20 is reflected by total internal reflection on the first surface 11 of the optical means 10 again and then transferred to the second reflective means 30, and is reflected by the second reflective means 30 and transferred to the pupil 50.

Figure 39:
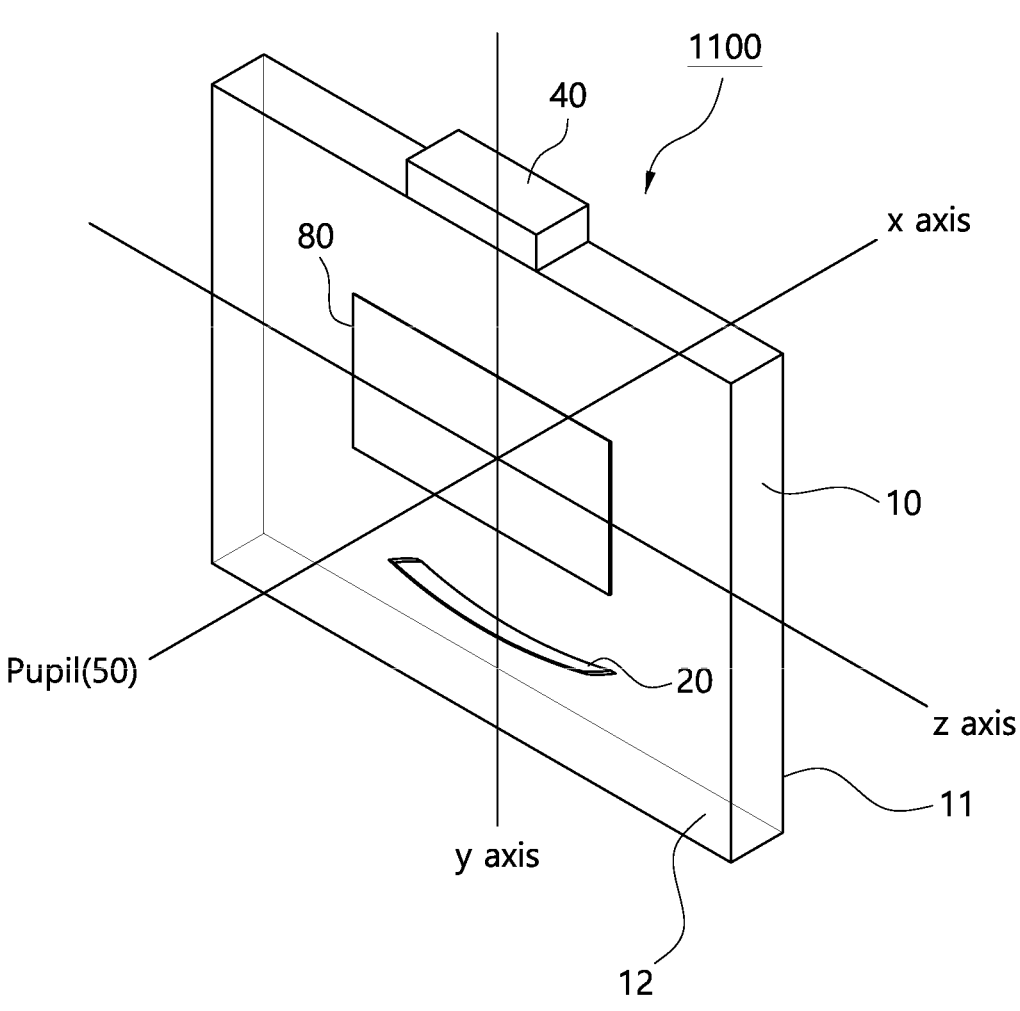
FIGS. 39 and 40 are a perspective view and side view of an optical device (1100) for augmented reality according to still another embodiment of the present invention.
Figure 40:
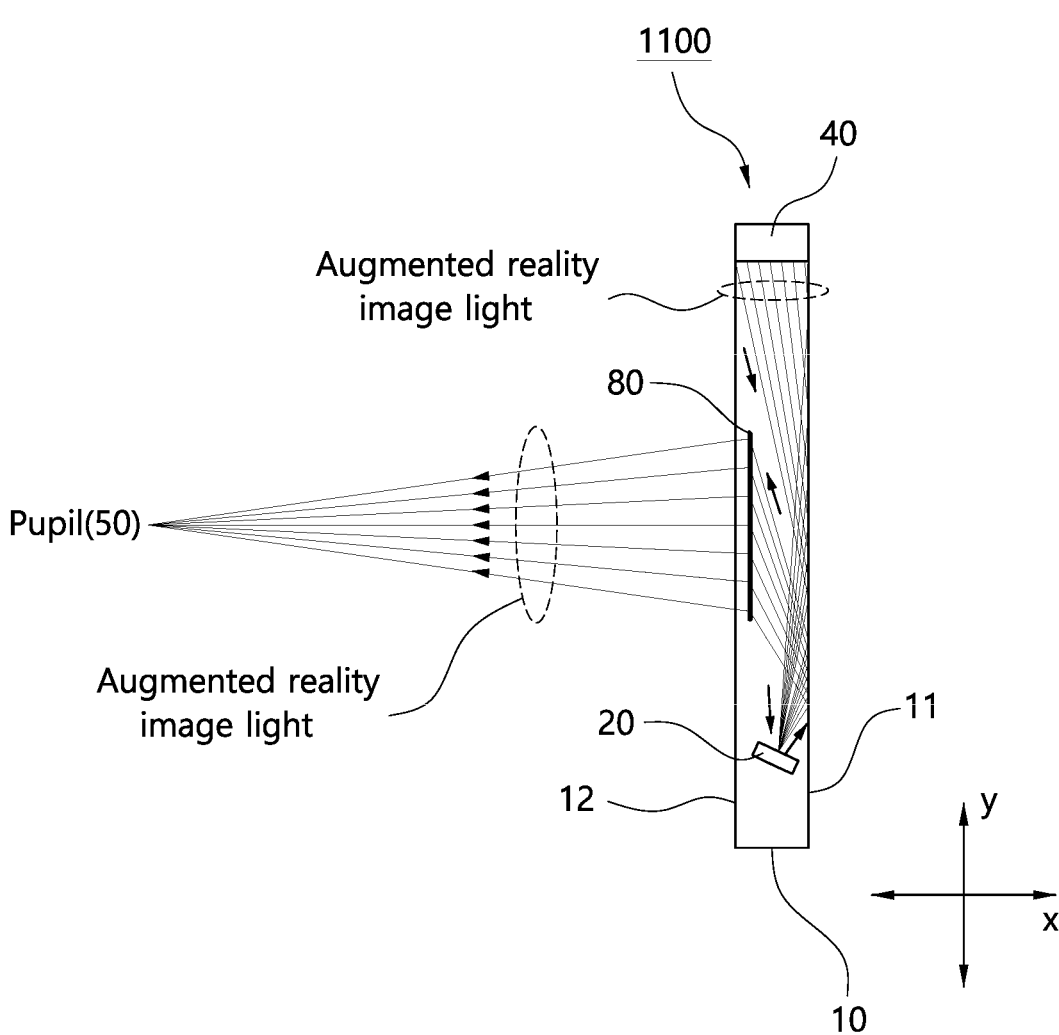

FIGS. 39 and 40 are diagrams illustrating an optical device 1100 for augmented reality according to still another embodiment of the present invention, in which FIG. 39 is a perspective view when the optical device 1100 for augmented reality is placed in front of the pupil 50, and FIG. 40 is a side view when the optical device 1100 for augmented reality is placed in front of the pupil 50.

The optical device 1100 for augmented reality of the embodiment of FIGS. 39 and 40 is basically the same as the optical device 900 for augmented reality described with reference to FIGS. 33 to 35, but there is a difference in that an optical element 80 is shaped in the form of a single plane disposed inside the optical means 10 so that the optical element 80 appears in the form of a single straight line when the optical means 10 is viewed toward a plane perpendicular to the z axis.

In other words, as shown in FIGS. 39 and 40, when the optical means 10 is placed in front of a user's pupil 50, a forward direction from the pupil 50 is set as the x axis, any one of the line segments passing between the first and second surfaces 11 and 12 of the optical means 10 while being parallel to a vertical line from the image output unit 40 to the x axis along the x axis is set as the y axis, and a line segment orthogonal to the x axis and the y axis is set as the z axis, the optical element 80 is shaped in the form of a single plane disposed inside the optical means 10 so that the optical element 80 appears in the form of a single straight line when the optical means 10 is viewed from the outside toward a plane perpendicular to the z axis.

In FIG. 40, the arrows indicate the optical paths of augmented reality image light. As described above, the augmented reality image light output from the image output unit 40 is reflected by total internal reflection on the first surface 11 of the optical means 10 and transferred to the first reflective means 20, and the augmented reality image light reflected by the first reflective means 20 is reflected by total internal reflection on the first surface 11 of the optical means 10 again and then transferred to the optical element 80, and is transferred to the pupil 50 through the optical element 80.

Since other components are the same as those described in FIGS. 33 to 35, detailed descriptions thereof are omitted.

Although the configuration of the present invention has been described with reference to the preferred embodiments of the present invention above, it is obvious that the present invention is not limited to the above-described embodiments and various modifications and alterations may be possible within the scope of the present invention.

For example, a method of attaching a concave or convex lens to the second surface 12 of the optical means 10 may be used for a refractive error user having nearsightedness or farsightedness. In this case, the attached concave or convex lens may be integrated with the optical means 10, or may be formed as a separate module and then detachably coupled to the optical means 10.

The invention claimed is:

1. A compact optical device for augmented reality having a straightly-arranged optical structure, the compact optical device comprising:
   an optical means configured to transmit at least part of real object image light therethrough toward a pupil of a user's eye;
   a first reflective means embedded and disposed inside the optical means, and configured to transfer augmented reality image light, which is image light corresponding to an image for augmented reality output from an image output unit, to a second reflective means; and
   the second reflective means including a plurality of reflective units embedded and disposed in the optical means to transfer the augmented reality image light, transferred from the first reflective means, to the pupil of the user's eye by reflecting the augmented reality image light toward the pupil;
   wherein the optical means has a first surface on which real object image light is incident, and a second surface through which the augmented reality image light transferred through the second reflective means and the real object image light are output toward the pupil of the user's eye;

wherein the second reflective means includes a plurality of reflective units having a size of 4 mm or less that are embedded and disposed inside the optical means;

wherein, when the optical means is placed in front of the user's pupil and a forward direction from the pupil is set as an x axis, the image output unit is disposed outside or inside the optical means to be located on a straight line orthogonal to the x axis; and wherein, when any one of line segments passing between the first and second surfaces of the optical means while being parallel to a vertical line extending from the image output unit to the x axis along the x axis is set as a y axis and a line segment orthogonal to the x axis and the y axis is set as a z axis:

at least two of the plurality of reflective units form a first reflective unit group disposed inside the optical means so that centers thereof are located on a first straight line when the optical means is viewed from an outside toward a plane perpendicular to the z axis;

at least two of remaining reflective units excluding the reflective units forming the first reflective unit group among the plurality of reflective units form a second reflective unit group disposed inside the optical means so that centers thereof are located on a second straight line that is not parallel to the first straight line when the optical means is viewed from an outside toward a plane perpendicular to the z axis;

the reflective units forming the first reflective unit group are disposed inside the optical means to be located closer to the second surface of the optical means as a distance from the image output part increases; and the first reflective unit group is arranged to be positioned closer to the first reflective means than the second reflective unit group.

2. The compact optical device of claim 1, wherein the reflective units constituting the second reflective unit group have a same distance to the second surface of the optical means regardless of a distance from the first reflective means.

3. The compact optical device of claim 1, wherein the reflective units constituting the second reflective unit group are disposed farther from the second surface of the optical means as a distance from the first reflective means increases.

4. The compact optical device of claim 1, wherein the first straight line and the second straight line are included in any one plane perpendicular to the z axis.

5. The compact optical device of claim 1, wherein the augmented reality image light output from the image output unit is directly transferred to the first reflective means through an inside of the optical means, or is reflected by total internal reflection on an inner surface of the optical means at least once and then transferred to the first reflective means.

6. The compact optical device of claim 1, wherein the first reflective means directly transfers the augmented reality image light to the second reflective means, or transfers the augmented reality image light to the second reflective means after the augmented reality image light has been reflected by total internal reflection on an inner surface of the optical means at least once.

7. The compact optical device of claim 1, wherein a reflective surface of the first reflective means that reflects the augmented reality image light is disposed to face the first surface of the optical means on which the real object image light is incident.

8. The compact optical device of claim 1, wherein a reflective surface of the first reflective means is formed as a curved surface formed to be concave toward the first surface of the optical means.

9. The compact optical device of claim 8, wherein the first reflective means is formed to extend closer to the second reflective means in directions from a central portion thereof toward both left and right ends thereof when the optical means is viewed from the pupil toward a forward direction.

10. The compact optical device of claim 1, wherein a length of the first reflective means in a widthwise direction is 4 mm or less.

11. The compact optical device of claim 1, wherein the second reflective means includes a plurality of second reflective means, and the plurality of second reflective means are arranged in parallel at intervals along a direction of the z-axis.

12. The compact optical device of claim 11, wherein there is present at least one second reflective means that is disposed such that distances between the individual reflective means and the second surface of the optical means are not all the same.

13. The compact optical device of claim 11, wherein each of the second reflective means is arranged such that each of the reflective units constituting each of the second reflective means is positioned together with any one of reflective units constituting an adjacent second reflective means along an imaginary straight line parallel to the z axis.

14. The compact optical device of claim 11, wherein each of the second reflective means is arranged such that each of reflective units constituting each of the second reflective means is not positioned together with all reflective units constituting an adjacent second reflective mean along an imaginary straight line parallel to the z axis.

15. The compact optical device of claim 1, wherein the plurality of reflective units are formed in bar shapes extending along imaginary straight lines parallel to the z axis.

16. The compact optical device of claim 1, wherein the first reflective means is formed to extend closer to the second reflective means in directions from a central portion thereof toward both left and right ends thereof when the optical means is viewed from a plane perpendicular to the x axis.

17. The compact optical device of claim 1, wherein a third surface through which the augmented reality image light output from the image output unit is incident on the optical means is formed as a curved surface to have refractive power.

18. The compact optical device of claim 17, wherein an auxiliary optical means is disposed between the image output unit and the third surface.

19. The compact optical device of claim 1, wherein at least some of the plurality of reflective units are each formed of a half mirror or a refractive element.

20. The compact optical device of claim 1, wherein at least some of the plurality of reflective units are each coated with a material absorbing light without reflecting light on a surface thereof opposite to a surface thereof that reflects the augmented reality image light.

21. The compact optical device of claim 1, wherein surfaces of at least some of the plurality of reflective units are each formed as a curved surface.

22. The compact optical device of claim 1, wherein at least some of the plurality of reflective units are each formed of a diffractive optical element (DOE) or a holographic optical element (HOE).

23. A method for manufacturing the optical means of claim 1, the method comprising:

a first step of forming reflective units on a surface of a lower base substrate along a first direction;

a second step of forming reflective units on a surface of each of a plurality of first substrates along a direction parallel to the first direction, and forming reflective units on a surface of each of a plurality of second substrates along a direction parallel to the first direction;

a third step of sequentially bonding and stacking the plurality of first substrates on the surface of the lower base substrate;

a fourth step of, after the third step, forming a second reflective means by sequentially bonding and stacking the plurality of second substrates on an uppermost one of the first substrates;

a fifth step of forming an optical means base material by bonding and stacking an upper base substrate including a first reflective means on an uppermost one of the second substrates; and a sixth step of forming the optical means by processing the optical means base material;

wherein the second step includes forming reflective units on a surface of each of the first and second substrates so that a line connecting centers of reflective units formed on surfaces of the respective first substrates forms a straight line and a line connecting centers of reflective units formed on surfaces of the respective second substrates forms a straight line when the first and second substrates are viewed from an outside toward a plane perpendicular to the first direction;

wherein the straight line connecting the centers of the reflective units formed on the first substrates and the straight line connecting the centers of the reflective units formed on the second substrates are not parallel to each other; and wherein the sixth step includes forming the optical means by cutting the optical means base material in directions parallel to the first direction along two parallel straight lines that allow the reflective units to be all included therebetween when the optical means base material is viewed toward a plane perpendicular to the first direction.

24. The method of claim 23, wherein the plurality of first substrates have a same shape, the plurality of second substrates have a same shape, and the plurality of first substrates and the plurality of second substrates have different shapes.

25. The method of claim 24, wherein, when the optical means base material is viewed toward a plane perpendicular to the first direction, a height of any one of both ends of the plurality of first substrates and both ends of the plurality of second substrates is higher than that of a remaining end.

26. A method for manufacturing the optical means of claim 1, the method comprising:

a first step of forming reflective units on a surface of a lower base substrate along a first direction;

a second step of sequentially bonding and stacking a plurality of first substrates on the surface of the lower base substrate, and forming reflective units on a surface of each of the plurality of first substrates along a direction parallel to the first direction;

a third step of, after the second step, sequentially bonding and stacking a plurality of second substrates on an uppermost one of the first substrates, and forming reflective units on a surface of each of the plurality of second substrates along a direction parallel to the first direction, thereby constructing a second reflective means;

a fourth step of forming an optical means base material by bonding and stacking an upper base substrate, including a first reflective means, on an uppermost one of the second substrates; and a fifth step of forming an optical means by processing the optical means base material;

wherein the second step includes forming reflective units on a surface of each of the first substrates so that a line connecting centers of reflective units formed on surfaces of the respective first substrates forms a straight line when the first substrates are viewed from an outside toward a plane perpendicular to the first direction;

wherein the third step includes forming reflective units on a surface of each of the second substrates so that a line connecting centers of reflective units formed on surfaces of the respectively second substrates form a straight line when the second substrates are viewed from an outside toward a plane perpendicular to the first direction;

wherein the straight line connecting the centers of the reflective units formed on the first substrates and the straight line connecting the centers of the reflective units formed on the second substrates are not parallel to each other; and wherein the fifth step includes cutting the optical means base material in directions parallel to the first direction along two parallel straight lines that allow the reflective units to be all included therebetween when the optical means base material is viewed toward a plane perpendicular to the first direction.

* * * * *